United States Patent
Fujita et al.

[11] Patent Number: 6,108,283
[45] Date of Patent: *Aug. 22, 2000

[54] OPTICAL HEAD HAVING FOCUS ERROR DETECTION AND TRACKING ERROR DETECTION SENSORS ARRANGED ON SUBSTANTIALLY THE SAME PLANE

[75] Inventors: Teruo Fujita; Morihiro Karaki, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,060

[22] Filed: Aug. 6, 1997

[30] Foreign Application Priority Data

Aug. 20, 1996 [JP] Japan .................................... 8-218650

[51] Int. Cl.$^7$ ........................................................ G11B 7/00
[52] U.S. Cl. ........................................ 369/44.23; 369/112
[58] Field of Search ............................. 369/44.23, 44.24, 369/112, 110, 109, 44.41, 44.42, 44.12

[56] References Cited

U.S. PATENT DOCUMENTS

| | | | |
|---|---|---|---|
| 4,759,007 | 7/1988 | Eberly | 369/44.37 |
| 5,243,583 | 9/1993 | Ohuchida et al. | 369/109 |
| 5,337,300 | 8/1994 | Takishima et al. | 369/110 |
| 5,404,344 | 4/1995 | Imada et al. | 369/110 |
| 5,453,962 | 9/1995 | Fujita et al. | |
| 5,517,480 | 5/1996 | Matsuoka et al. | 369/44.24 |
| 5,559,767 | 9/1996 | Matsui | 369/44.23 |
| 5,559,783 | 9/1996 | Ishika | 369/44.23 |
| 5,579,291 | 11/1996 | Matsumoto | 369/110 |
| 5,586,095 | 12/1996 | Ichiura et al. | 369/44.24 |
| 5,627,806 | 5/1997 | Kobayashi | 369/44.23 |
| 5,657,305 | 8/1997 | Sasaki et al. | 369/110 |
| 5,673,214 | 9/1997 | Koyama et al. | 369/44.41 |
| 5,684,762 | 11/1997 | Kudo | 369/109 |
| 5,790,504 | 8/1998 | Hayashi et al. | 369/44.23 |
| 5,835,472 | 11/1998 | Horie et al. | 369/44.23 |
| 5,859,819 | 1/1999 | Miyabe et al. | 369/44.41 |

FOREIGN PATENT DOCUMENTS 4-286729  10/1992  Japan ................................ 369/44.37

OTHER PUBLICATIONS

"Focus Sensing Characteristics of the Pupil Obscuration Method for Continuously Grooved Disk", Japan Journal of Applied Physics, vol. 26, (1987); pp. 183–186.

"A Small Write–Once Optical Head", Abstracts of Eleventh Optical Symposium, Jul. 1, 1986, pp. 30–40.

"A split type optical head for 90mm magneto–optical disc drives," Denshi Tsushin Gakkai (The Inst. of Electronics and Communication Engineers of Japan) MR91–73, Feb. 27, 1992, pp 7–12.

*Primary Examiner*—Nabil Hindi

[57] ABSTRACT

Light reflected from an information recording surface is branched into first and second substantially parallel beams. The first beam is directed to a focus error detection system and the second beam is directed to a tracking error detection system. The photodetector includes light receiving sections for the two detection systems. The light receiving sections include Light receiving surfaces and are housed in a single package. A substantially flat plate is placed either in the focus error detection system or in the tracking error detection system, serving to shorten the optical path so as to create a difference in optical path length to the light receiving surfaces between the two detection systems, thereby enlarging the light spot on the light receiving sections for the tracking error detection system. A cylindrical lens placed in the tracking error detection system serves as astigmatism generating and to make the light spot on the light receiving section in the tracking error detection system to be enlarged in one direction. The light receiving surfaces of one detection system have division lines substantially perpendicular to that of the other detection system. The perpendicular division lines are effective in eliminating an inherent problem encountered in the prior art optical head that adjustment of the tracking error detection system affects the adjustment of the focus error detection system.

15 Claims, 29 Drawing Sheets

OPTICAL HEAD HAVING FOCUS ERROR DETECTION AND TRACKING ERROR DETECTION SENSORS ARRANGED ON SUBSTANTIALLY THE SAME PLANE

BACKGROUND OF THE INVENTION

1. Field of the Invention

The present invention relates to an optical head used for optically recording/reproducing information, and more particularly to an optical head which is easy to adjust, requires only inexpensive parts, and offers reliable focus error detection and tracking error detection.

2. Description of Related Art

FIG. 26 illustrates a general construction of a prior art optical head reported by Shinoda and Kondo, "A small Write-Once Optical Head," Abstracts of Eleventh Optical Symposium, Jul. 1, 1986, pp. 30–40, sponsored by Oyo Butsuri Gakkai Kogaku Konwakai (Optics Division, The Japan Society of Applied Physics).

Referring to FIG. 26, a light source such as a semiconductor laser emits a beam of light for recording and reproducing information recorded on an optical disc.

A polarization beam splitter 2 passes the light E emitted from the light source 1 toward an information recording medium 6 and reflects the light reflected back from the recording medium 6 to a focus error detection system, tracking error detection system, and information recording/reproducing system, which will be described later. The light passing the polarization beam splitter 2 is collimated by a collimator lens 3 and then passes through a quarter wave plate 4. The light then passes through an objective lens 5 which in turn focuses the light onto the information recording medium 6 such as an optical disc. The information recording medium 6 is formed with information tracks 7 therein.

The polarization beam splitter 2 directs the light reflected back from the information recording medium 6 to a roof prism 8. The roof prism 8 branches the light into two beams of light each of which has a semicircular cross section. Disposed downstream of the roof prism 8 are a concave lens 9 and beam splitter 10 in this order. A portion of the light passes through the beam splitter 10 to a photodetector assembly 12 and the remaining portion of the light is reflected by the beam splitter 10 to a two-division photodetector 11.

The two-division photodetector 11 includes two light-receiving elements 11a and 11b which receive the light reflected by the beam splitter 10. The two-division photodetector 11 cooperates with a subtractor or differential amplifier 13 to form the tracking error detection system which detects the tracking error of the light spot on the information track 7.

The photodetector assembly 12 receives the light which is reflected from the information recording medium 6 and passes through the beam splitter 10. The photodetector assembly 12 includes four light-receiving elements 19–22, and cooperates with differential amplifiers 15, 16, and 17 and the roof prism 8 to form the focus error detection system which detects the focus error of the light spot. The differential amplifier 15 and 16 outputs the difference of the outputs from the light-receiving elements 22 and 21 and the difference of the outputs from the light receiving elements 20 and 19 respectively. The differential amplifier 17 outputs the difference between the outputs of the differential amplifiers 15 and 16.

The two-division photodetector 11 receives the light reflected by the beam splitter 10. The two outputs of the two-division photodetector 11 are directed to the differential amplifier 13 which outputs the difference between the two outputs, and to an adder 14 which outputs the sum.

Then, the light is reflected by the information recording medium 6 back through the objective Lens 5, quarter wave plate 4, and collimator lens 3. The reflected light beam is then incident upon the polarization beam splitter 2. The reflected light has rotated by 90° since it passes through the quarter wave plate 4 twice, once directly and again after being reflected by the medium 6. The reflected light beam is therefore reflected by the polarization beam splitter 2. Then the light emanating the polarization beam splitter 2 travels through the roof prism 8, concave lens 9 and is then incident upon the beam splitter 10. The splitter 10 separates the incident light into two light beams: a Light beam traveling toward the two-division photodetector 11 and a light beam traveling toward the photodetector assembly 12. The two-division photodetector 11 detects a tracking error signal TES by the push-pull method white the roof prism 8 and photodetector assembly 12 detect a focus error signal FES by the pupil obscuration method. The tracking error signal TES is amplified by the differential amplifier 13 and drives a tracking actuator of an objective lens driving mechanism. The focus error signal FES is amplified by the differential amplifiers 15, 16 and 17 and drives a focusing actuator of the objective lens driving mechanism.

The operation of the focus error detection of the optical head shown in FIG. 25 will be described with reference to FIGS. 26 and 27.

FIG. 27 illustrates a case where the light beam E is exactly focused on the information recording medium 6. Referring to FIG. 26, a lens 18 is equivalent to a combination of the collimator lens 3 and the concave lens 9 shown in FIG. 25 and therefore operates in the same way as the optical system that includes the collimator lens 3 and concave lens 9. The two-division photodetector 12a is positioned relative to the prism 8 such that when the light beam E is exactly focused on the recording medium 6, a light beam R1 is focused on the two-division photodetector 12a with the light spot centered on the boundary between the light-receiving elements 19 and 20.

The two-division photodetector 12b is positioned relative to the prism 8 such that when the light beam E is exactly focused on the information-recorded surface of the recording medium 6, the light beam R2 is focused on the two-division photodetector 12b with the light spot centered on the boundary between the light-receiving elements 21 and 22.

Therefore, when the beam E is focused on the information recording surface of the information recording medium 6, the light-receiving elements 19 and 20 receive the same amount of light and therefore the outputs of the light-receiving elements 21 and 22 also receive the same amount of light. Therefore, the sum S1 of the outputs of the light-receiving elements 19 and 22 is equal to the sum S2 of the outputs of the light-receiving elements 20 and 21.

FIG. 28 is a graph illustrating the relation between the focus error $\Delta z$, i.e., the distance between the converged spot and the information recording surface of the information recording medium 6. The focus error signal FES varies in proportion to the focus error $\Delta z$ over a range called linear zone. The linear zone when the pupil obscuration method is used is in the range of 2–3 $\mu m$ for NA of 0.5–0.6 of the objective lens. Reference is made to the following documents regarding to details of linear zone: G. Bouwhuis et al., Principles of Optical Disc System," published by Adam Hilger, pp. 77–79 (1985) and Irie et al., "Focus Sensing Characteristics of the Pupil Obscuration Method for Continuously Grooved Disk," Japan Journal of Applied Physics, vol. 26, pp. 183–186 (1987)."

The thus obtained focus error signal FES is directed via a phase compensator/amplifier to an objective lens-driving mechanism, not shown, which drives the objective lens so as to maintain the light E focused on the information recording surface.

The roof prism 8 is oriented so that its roof edge extends in a direction substantially perpendicular to the x-direction which is tangent to the information track 7 in the medium 6. The orientation of the roof prism 8 minimizes disturbances which may come into the focus error signal FES when the converged spot moves transversely of the information tracks 7 formed in the information recording medium 6.

Reference is made to the aforementioned Irie et al. reference regarding details of the minimizing of disturbances.

The adjustment of the focus error detection system of the optical head shown in FIG. 26 will be described.

The focus error detection system drives the lens 9 to move back and forth on its optical axis (z-direction), and to move a package 24 in which the two-division photodetectors 12a and 12b are housed. The package 24 is moved in the x-y plane in which the two-division photodetectors 12a and 12b are disposed, so that when the light E is focused on the information-recording surface of the medium 6, the light spots on the corresponding two-division photodetectors 12a and 12b are the smallest in size and are centered on the boundary between the two light-receiving elements 19 and 20 and on the boundary between the two light-receiving elements 21 and 22, respectively.

FIG. 29 illustrates the light spots on the two-division photodetectors 12a and 12b before adjustment of the optical head, the two light spots not being the smallest even though the light E is focused on the information-recording surface of the medium 6.

Then, the concave lens 9 is moved back and forth in the direction of its optical axis to a position where the sizes of the converged spots 25 and 26 are minimum.

Then, the package 24 is moved in the x-direction to bring one of the converged spots on the division line. FIG. 30 shows the converged spot 26 brought on the division line. Thereafter, the package 24 is moved in the x-y plane so as to bring another converged spot 25 on the division line as shown in FIG. 31. It is not easy to simultaneously bring both the converged spots 25 and 26 on their corresponding division lines since the converged spot 26 deviates from its corresponding division line as the converged spot 25 is moved on the tight receiving surface of the light-receiving elements 19 and 20. The package 24 is slowly moved in the x-y plane while monitoring the output signals of the two-division photodetectors 12a and 12b that represent the positions of the converged spots 25 and 26 relative to their corresponding division lines, respectively.

Finally, the adjustment of the tracking error detection system of the optical head will be described.

The tracking error detection system causes the light-receiving elements 11a and 11b of the two-division photodetector 11 to move in order to adjust the positions of the light receiving elements so that the elements 11a and 11b receive the same amount of light as shown in FIG. 32 when the converged spot of the light E is focused on the information recording surface. With the prior art optical head shown in FIG. 26, the two-division photodetector 11 may be at any position in the converged light beam along the optical axis of the light beam except at the focal point. The size of the light spot incident upon the two-division photodetector 11 is, for example, in the range of 0.5–0.7 mm diameter if the light receiving element has a light-receiving area of 1 mm×1 mm.

The prior art optical head of the aforementioned construction is disadvantageous in that the focus error detection and tracking error detection each need an exclusively provided photodetector.

During the focus error detection, the package 24 is moved in the x-y plane so as to bring the converged spots 25 and 26 on the corresponding division lines, respectively. Bringing one of the spots centered exactly on its corresponding division line results in some deviation of the other. In other words, the two converged spots 25 and 26 cannot be positioned independently from each other. Therefore, another disadvantage of the prior art optical head is that the adjustment of the focus error detection system is a time consuming operation. In addition, the focus error detection and tracking error detection system must be adjusted individually.

Still another problem with the prior art optical head is that the focus error signal FES linearly varies only in a narrow range of about 2–3 μm referred to as linear zone. A narrow linear zone is disadvantageous in that the servo control is susceptible to external disturbances such as mechanical impacts and vibrations, being difficult to maintain the light E focused on the information recording surface of the medium 6. A minute positional deviation of the photodetector assembly 12 results in a large change in the focus error signal FES and the focus error directly reflects the minute change in electrical offset within the servo circuit.

SUMMARY OF THE INVENTION

The present invention was made in view of the aforementioned problems.

An object of the invention is to provide an optical head which has photodetectors for the focus error detection and tracking error detection, the photodetectors being housed in a single package. The optical head implements an optical head at reduced material costs.

Another object of the invention is to provide an optical head which facilitates the adjustment of the focus error detection system and tracking error detection system of the optical head, thereby implementing an optical head that can be adjusted in the least adjustment time.

Still another object of the invention is to provide an optical head which produces stable, a reliable focus error signal and a tracking error signal.

Light emitted from a light source is focused on the information recording surface of an information recording medium. The light reflected from the information recording surface is branched into a first and second substantially parallel light beams. The first light beam is directed to a focus error detection system for producing a focus error signal and the second beam of light is directed to a tracking error detection system for producing a tracking error signal. The photodetector includes light receiving sections for the focus error detection system and tracking error detection system which are housed in a single package. A substantially flat plate is placed either in the focus error detection system or in the tracking error detection system. The flat plate serves to shorten the optical path so as to expand a difference in optical path length between the focus error detection system and the tracking error detection system.

Placing a cylindrical lens in the tracking error detection system causes the light spot on the light receiving section in the tracking error detection system to be enlarged in one direction.

Another cylindrical lens may be provided so that light beams directed to the tracking error detection system and focus error detection system pass through the cylindrical lens. The cylindrical lens causes the light spots on the light receiving sections in the tracking error detection system and in the focus error detection system to be enlarged in one directions.

Use of both transparent flat plate and cylindrical lens is more effective in enlarging the light spots on the light receiving sections.

The light receiving section has light receiving surfaces divided by a division line in the form of a saw tooth wave, sinusoidal wave, or triangular wave which effectively increases equivalent width of the division line.

The light receiving surfaces of the focus error detection system have division lines substantially perpendicular to that of the tracking error detection system. The perpendicular division lines is effective in eliminating an inherent problem encountered in the prior art optical head that adjustment of the tracking error detection system affects the adjustment of the focus error detection system.

The boundary lines between the transparent flat plate and diffraction grating and between the transparent flat plate and wedge shaped transparent plate, serve to function as an edge line of a prior art roof-type prism, separating the light beam reflected by the information recording medium into a plurality of light beams having a substantially semicircular cross section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be described in detail with reference to the drawings.

First Embodiment

Figure 1:
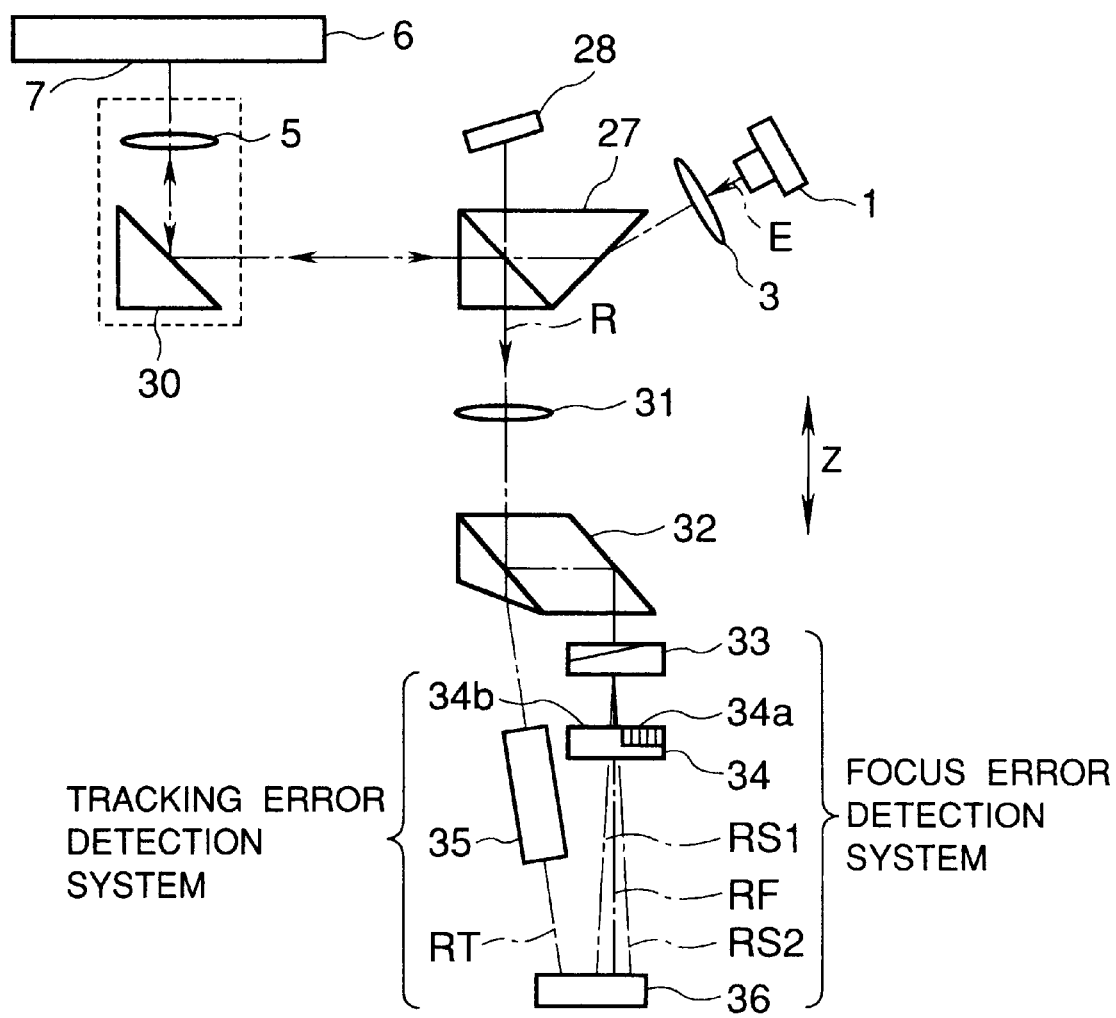
FIG. 1 illustrates a general construction of an optical head according to a first embodiment of the invention.

FIG. 1 illustrates a general construction of an optical head according to a first embodiment of the invention. Referring to FIG. 1, structural elements denoted by 1, 3, 5, and 6 are the same as those in the prior art shown in FIG. 25. A beam splitter 27 directs the light passing through a collimator lens 3 toward an optical recording medium 6 and reflects part of the light incident thereon toward a photosensor 28 which monitors the intensity of the light. The beam splitter 27 also directs the light reflected back from the information recording medium 6 to a focus error detection system, tracking error detection system, and a later described information detection system. The beam splitter 27 also serves to shape the beam from a substantially elliptical cross-section of the light resulting from the properties of the light source 1 into a circular cross section. A mirror 30 reflects the light from the light source 1 toward the information recording medium 6. A converging lens 31 converts the substantially parallel light beam, reflected by the beam splitter 27, into a converged light beam. A beam splitter 32 branches the light from the converging lens 31 into a light beam directed to a tracking error detection system and a light beam directed to focus error detection/information detection systems. A Wollaston prism 33 separates the light beam into a light beam transmitted toward the focus error detection system and two light beams transmitted toward the information detection system. A light beam dividing element 34 separates the light beam RF into two or more light beams and has a diffraction grating in a half of its surface. The light beam dividing element 34 includes a transparent flat area 34b and a diffraction grating area 34a in which a diffraction grating is formed. The diffraction grating includes a plurality of grooves having a U-shape cross section. The boundary between the diffraction grating area 34a and the transparent flat area 34b geometrically divides the reflected light beam RF into two substantially equal parts.

A transparent plate 35 in the tracking error detection system is a substantially flat plate. A photodetector assembly 36 has a plurality of photodetectors housed in a single package, the photodetectors being arranged in the same plane to receive the light beams for tracking error detection, focus error detection, and information detection.

The optical head shown in FIG. 1 is of a construction which is applied to the recording medium 6 having an information recording surface 7 in the form of a magneto-optical recording medium. Therefore, if the information recording medium 6 having an information recording surface of write once type as mentioned in the description of the prior art is to be used, the Wollaston prism 33 in FIG. 1 is not required and information recorded on the information recording medium may be reproduced from the sum of the outputs of a two-division photodetector 37 (FIG. 2) of the tracking error detection system, the sum of the outputs of a six-division photodetector 40 (FIG. 2) of the focus error detection system, or the sum of the outputs of the two-division photodetector 37 and the outputs of the six-division photodetector 40.

Figure 2:
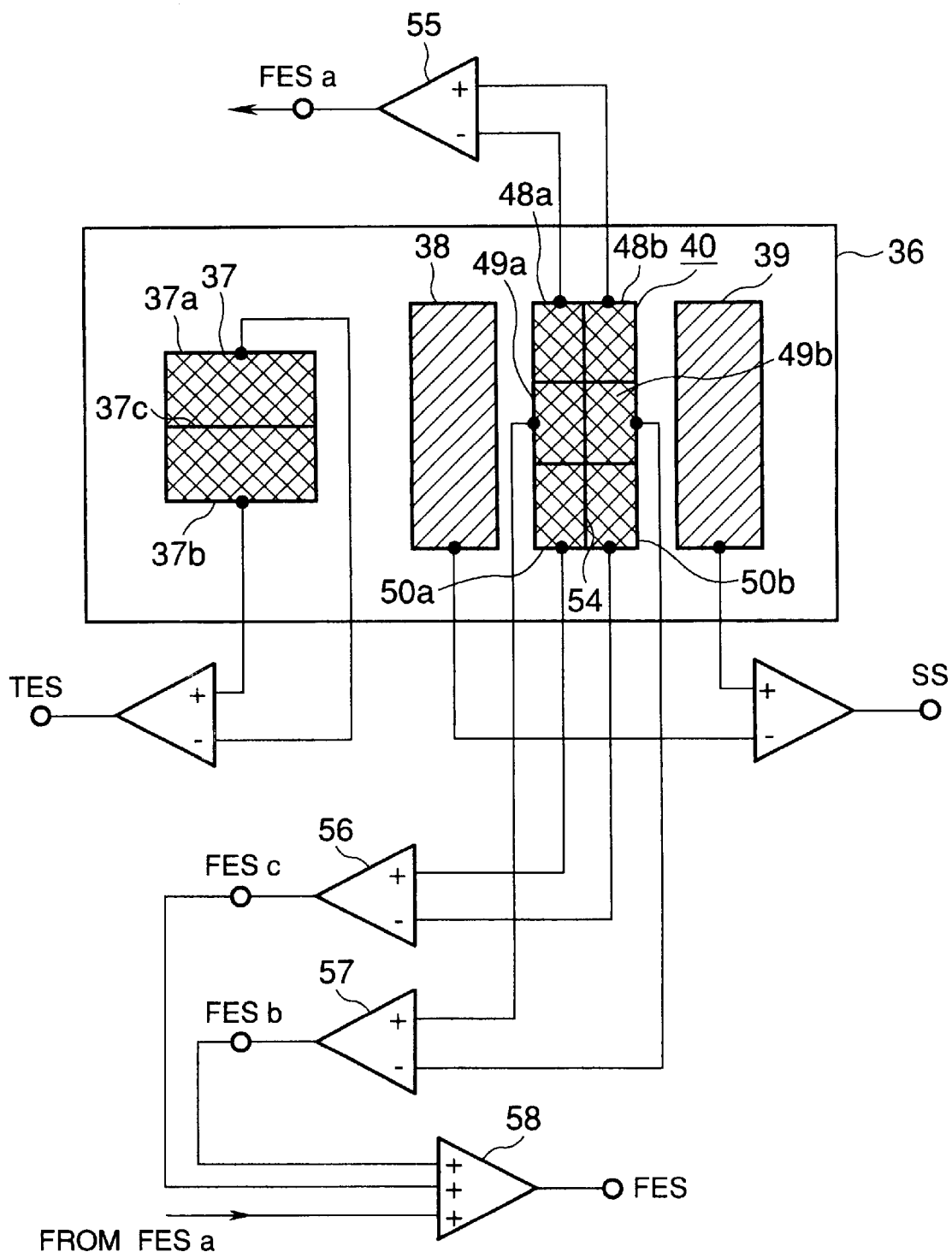
FIG. 2 illustrates the photodetectors of the photodetector assembly of FIG. 1.

FIG. 2 illustrates the light receiving section of the photodetector assembly 36. The two-division photodetector 37 is for tracking error detection. Photodetectors 38 and 39 receive the light beams RS1 and RS2 in FIG. 1 from which recorded information is detected. The six-division photodetector 40 is for focus error detection and includes two-division photodetectors 48, 49, 50. Tracking error signal TES is produced by taking the difference between the output signals of the light-receiving elements 37a and 37b that receive the light beam RT shown in FIG. 1. The recorded information or reproduction signal SS is extracted by taking the difference between the outputs of the photodetectors 38 and 39 that receive the light beams RS1 and RS2 shown in FIG. 1. Focus error signal FES is produced by performing an operation of the outputs of the respective photodetectors 48, 49, and 50 in the six-division photodetector 40 that receives the light beam RF. The operation of the output of the six-division photodetector 40 for producing the focus error signal FES will be described later.

Figure 3:
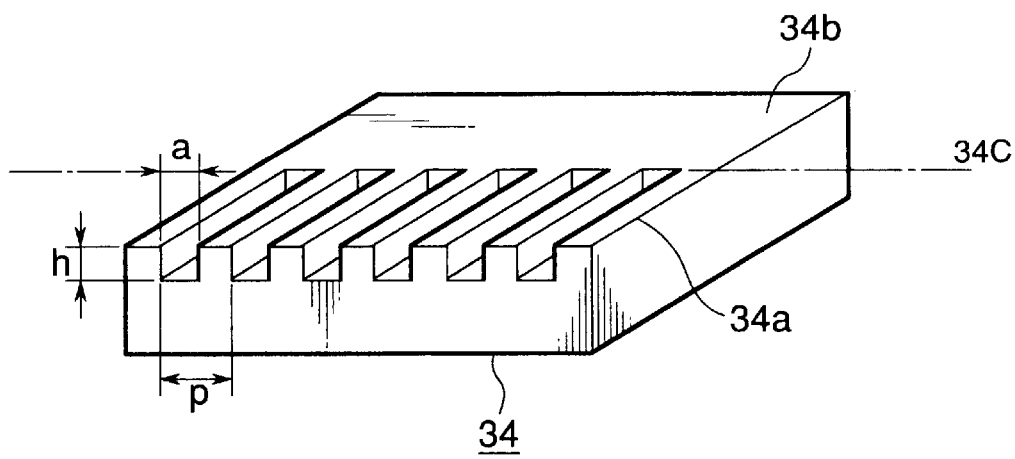
FIG. 3 illustrates an example of light beam-dividing element 34.

FIG. 3 illustrates an example of light bean-dividing element 34. The element 34 is made of a transparent material having a refractive index n and the diffraction grating has a plurality of rectangular grooves with a depth h, width a, and period p. The grooves extend straight and the period p is constant. The boundary 34c between the diffraction grating area 34a and flat area 34b extend straight in a direction substantially perpendicular to the grooves.

The depth h and width a are generally given by the following equations.

$$h=\lambda/\{2(n-1)\} \qquad (1)$$

$$a=p/2 \qquad (2)$$

where λ is the wavelength of light used.

This implies that the diffraction grating yield a modulation in phase, the light being phase-modulated with a duty cycle of 50% and a modulation depth of 180 degrees.

If there is no Fresnel loss on the front and back sides of the light beam dividing element 34, 40.5% of the light beam incident upon the diffraction grating area 34a is diffracted as a first order diffracted light and the other 40.5% of which as a negative first order diffracted light, no zeroth order diffracted light, and about 20% of which as odd order diffracted light, i.e., third order and higher.

Figure 4:
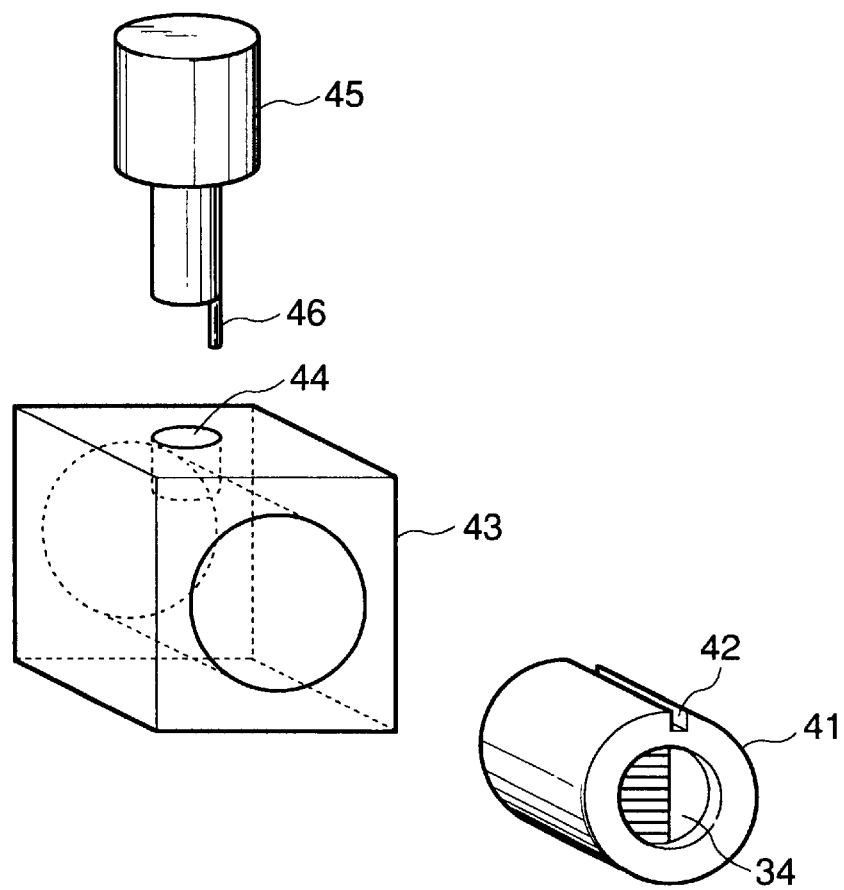
FIG. 4 illustrates an example of a construction which rotatably supports the light beam dividing element 39.

FIG. 4 illustrates a construction in which the light beam dividing element 34 is rotatably supported. A cylindrical holder 41 holds the light beam-dividing element 34 and is formed with a groove 42 therein extending in parallel with the optical axis. The cylindrical holder 41 is slidably and rotatably held in a block 43 which has a round hole 44 formed in its side. An eccentric driver 45 has a projection 46 which is received in the groove 42 in the holder 41 so that the rotation of the eccentric driver 45 causes the holder 41 to rotate relative to the block 43. Therefore, the adjustable rotation of the holder 41 causes the light beam-dividing element 34 to adjustably rotate through an angle.

Figure 5:
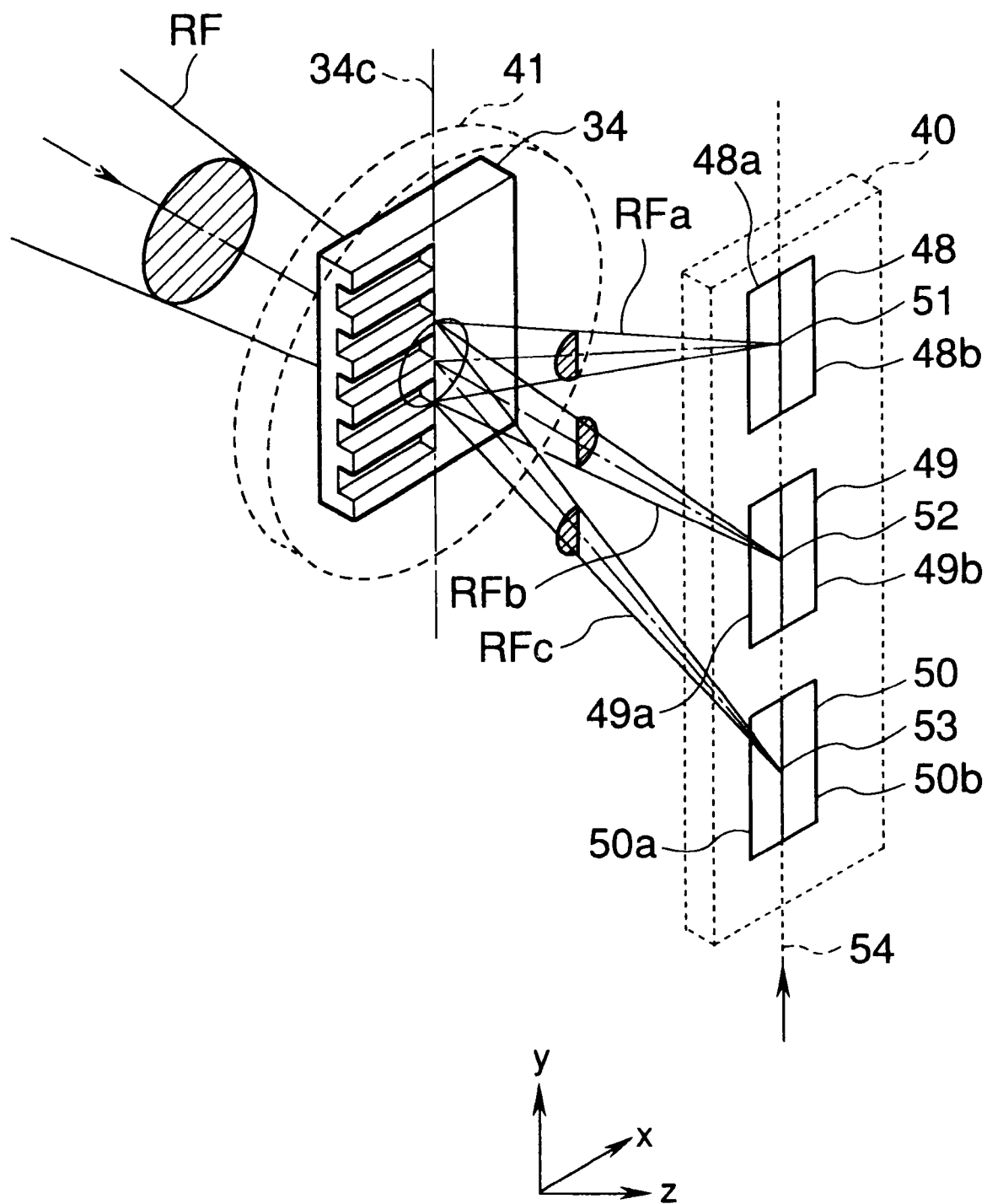
FIG. 5 illustrates the first embodiment showing light spots on the two-division photodetectors in the focus error detection system when the light E is focused on the information recording surface or a information recording medium.

FIG. 5 illustrates the behavior of the light beam RF in FIG. 1 that is a middle beam of the three beams coming out from the Wollaston prism 33, showing the light beam RF before and after it has passed the light beam dividing element 34. The light beam RF includes light beam RFb passing through the transparent flat area 34b and light beams RFa and RFc passing through the diffraction grating area 34a.

A section 40 is a part of the photodetector assembly 36 and receives light for detecting focus error. The section 40 includes two-division photodetectors 48, 49, and 50 which receive focused light spots 51, 52, and 53 of the light beams RFa, RFb, and RFc, respectively. The two-division photodetectors 48, 49, and 50 have light-receiving elements 48a and 48b, 49a and 49b, and 50a and 50b, respectively, which are arranged such that the light-receiving elements 48a, 49a, and 50a are located on one side of a straight line 54 and the light-receiving elements 48b, 49b, and 50b are located on the other. The line 54 is substantially in parallel with the boundary 34c between the diffraction grating area 34a and transparent flat area 34b of the light beam dividing element 34. The light-receiving elements 48a and 48b, 43a and 49b, and 50a and 50b are in the same plane perpendicular to the optical axis R of the light beam RF.

The production of the focus error signal FES will be described with reference to FIG. 2. Focus error signal FESa is produced by the two-division photodetector 48 and represents the difference between the outputs of the light-receiving elements 48a and 48b. Focus error signal FESb is produced by the two-division photodetector 49 and represents the difference between the outputs of the light-receiving elements 49a and 49b. Focus error signal FESc is produced by the two-division photodetector 50 and represents the difference between the outputs of the light-receiving elements 50a and 50b. Differential amplifiers 55, 56, and 57 output the focus error signals FESa, FESb, and FESc, respectively. An adder 58 adds the focus error signals FESa, FESb, and FESc to produce the focus error signal FES.

Next, the operation of the first embodiment shown in FIG. 1 will now be described with reference to FIGS. 5–12.

When reproducing information from the information recording medium 6, the light E coming out from the Light source 1 is collimated by the collimator lens 3 and passes through the beam splitter 27. The light E is reflected by the mirror 30 to the objective lens 5. The light E is then focused as a light spot by the objective lens 5 on the information recording surface 7a of the information recording medium 6. The light E is reflected by the information recording surface 7a and passes as a reflected light beam having an optical axis R through the objective lens 5 and is then reflected by the beam splitter 27 to the converging lens 31 which converts the light into a converged light beam. Then, part of the reflected light team is reflected twice by the beam splitter 32 to the focus error detection system and information detection system, and the rest of the reflected light beam is transmitted through the beam splitter 32 to the tracking error detection system.

The two-division photodetector 48 is positioned so that the converged light spot 51 of RFa is on the division line between the light receiving elements 48a and 48b as shown in FIG. 5 when the light E is focused exactly on the information recording surface 7a. Likewise the two-division photodetectors 49 and 50 are positioned so that the converged Light spots 52 of RFb and 53 of RFc are on the corresponding division line of the two-division photodetectors 49 and 50, respectively. When the light E is focused on the information recording surface 7a, the light receiving elements 48a and 48b receive the same amount of light and they output signals of the same magnitude. Similarly, the light receiving elements 49a and 49b receive the same amount of light and they output signals of the same magnitude. The light receiving elements 50a and 50b also receive the same amount of light and they output signals of the same magnitude. Thus, the focus error signals FESa, FESb, and FESc are all zero and the sum FES of these focus error signals is therefore zero.

Figure 6:
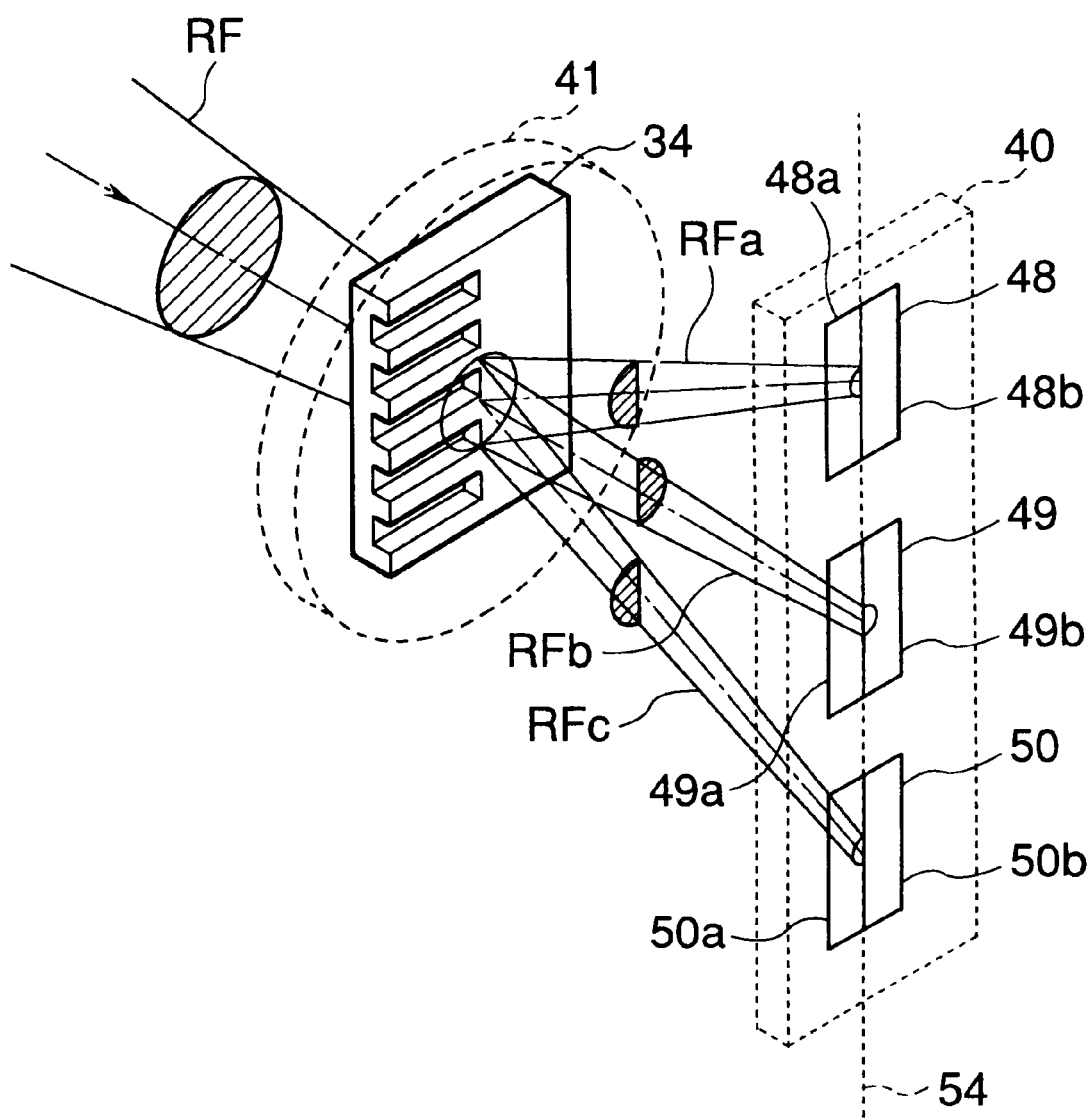
FIG. 6 illustrates the light spots on the two-division photodetectors 48, 49, and 50 when the focal points of the light beams RFa, RFb, and RFc are beyond the two-division photodetectors.

When the information recording medium 6 is a distance Δ Z (usually several microns) closer to the objective lens 5 than the focal point, the focus error signals behave as follows:

As shown in FIG. 6, the focal points of the light beams RFa, RFb, and RFc are behind the surfaces of the two-division photodetectors 48, 49, and 50, respectively. Thus, most of the light beam RFa is incident on the light-receiving element 48a and little or no light is incident on the light-receiving element 48b. Likewise, most of the light beam RFb is incident on the light-receiving, element 49b and little or no light is incident on the light-receiving element 49a, and most of the light beam RFc is incident on the light-receiving element 50a and little or no light is incident on the light-receiving element 50b.

The light-receiving element 48a outputs a larger output signal than the light-receiving element 48b and therefore focus error signal, FESa, i.e., the difference between the two output signals is a positive value. Likewise, the focus error signals FESb and FESc are positive values. Therefore, the focus error signal FES, i.e., the sum of the FESa, FESb, and FESc is a positive value.

Figure 7:
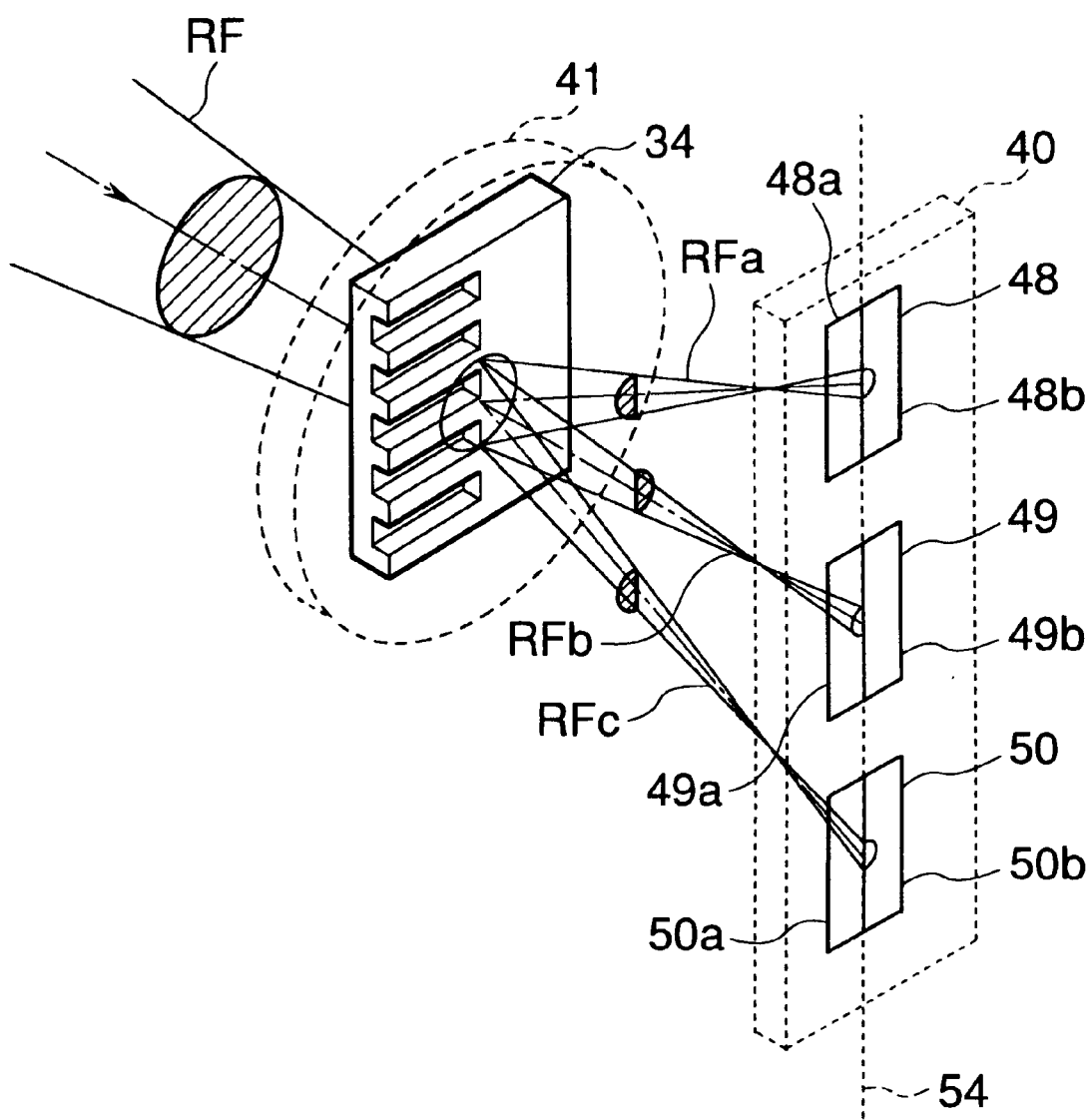
FIG. 7 illustrates the light spots on the two-division photodetector 48, 49, and 50 when the focal points of the light beams RFa, RFb, and RFc are in front of the two-division photodetectors.

When the information recording medium 6 is a distance Δ Z (usually several microns) away from the objective lens 5 than the focal point, the focus error signals behave as follows:

As shown in FIG. 7, the focal points of the light beams RFa, RFb, and RFc are in front of the two-division photodetectors 48, 49, and 50, respectively. This, most of the light beam RFa is incident on the light-receiving element 48b and little or no light is incident on the light-receiving element 48a. Likewise, most of the light beam RFb is incident on the light-receiving element 49a aid little or no light is incident on the light-receiving element 49b, and most of the light beam RFc is incident on the light-receiving element 50b and little or no light is incident on the light-receiving element 50a.

The light-receiving element 48b outputs a larger output signal than the light-receiving element 48a and therefore focus error signal FESa or the difference between the two output signals is a negative value. Likewise, the focus error signals FESb and FESc are negative values. The focus error signal FES or the sum of the FESa, FESb, and FESc is a negative value.

As described above, the focus error signal FES is zero when the objective lens 5 is positioned relative to the information recording surface 7a so that the light E is focused on the information recording surface 7a. The focus error signal FES is positive when objective lens 5 is too close to the information recording surface 7a, and is negative when objective lens 5 is away from the information recording surface 7a. The focus error signal FES is supplied via the phase compensator/amplifier 21 to the objective lens driving mechanism, not shown, which in turn drives the objective lens 5 to focus the light E exactly on the information recording surface 7a of the information recording medium 6. The boundary between the diffraction grating area 34a and transparent substantially flat area 34b functions the same way as the edge of the roof prism 8 of the prior art optical head in FIG. 25. The boundary extends substantially perpendicular to a direction tangent to the information tracks 7 formed in the information recording medium 6 shown in FIG. 25 so that the disturbances coming into the focus error signal FES are minimum when the light spot moves across the information tracks 7.

Figure 8:
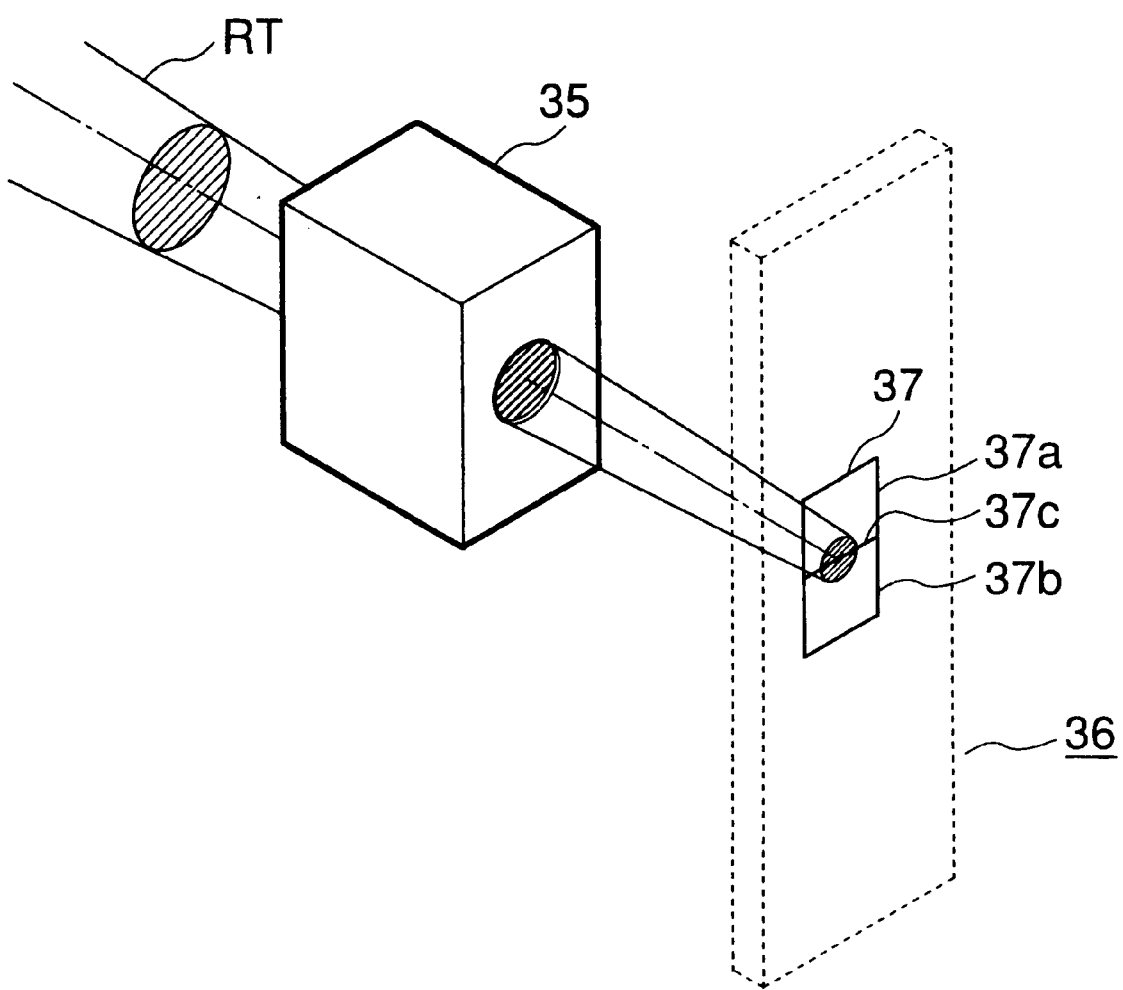
FIG. 8 illustrates the light spots on the two-division photodetectors in the tracking error detection system.

The tracking error detection system operates on the same principle as the prior art optical head and detailed description thereof is omitted. As shown in FIG. 8, the light beam RT passing through the beam splitter 32 passes through the substantially flat, transparent plate 35 towards the photodetector assembly 36. The light beam FT is then incident upon the light-receiving elements 37a end 37b of the two-division photodetector 37 of the photodetector assembly 36 and the tracking error signal TES is produced on the basis of the difference between the outputs of the light-receiving elements 37a and 37b.

The adjustment of the optical head shown in FIG. 1 will now be described.

In the focus error detection system, the converging lens 31 is driven to move back and forth along the optical axis (z-direction in FIG. 5) of the converging lens 31, and the entire package of the photodetector assembly 36 is driven to move in the x-y plane (FIG. 5) in which the two-division photodetectors 12a arid 12b are disposed. The converging lens 31 and photodetector assembly 36 are moved so that when the light E is focused on the information-recording surface 7a of the information recording medium 6, the offset of the tracking error signal TES is zero and the light spots on the two-division photodetectors 48, 49, and 50 are minimum in size and are positioned on the boundaries between the corresponding two light-receiving elements.

Figure 9:
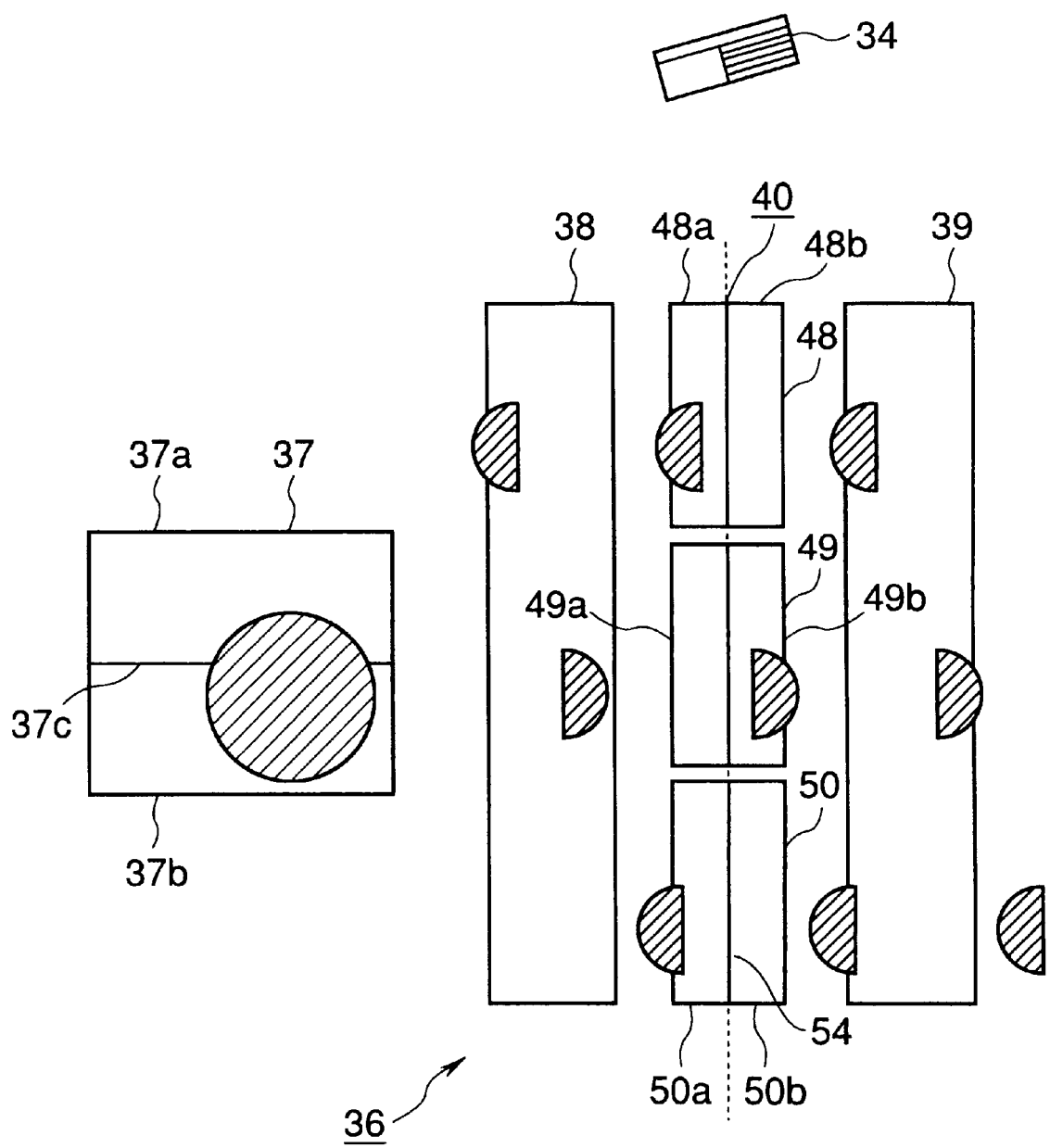
FIG. 9 illustrates the light spots on the respective photodetectors of the photodetector assembly 36 before adjustment of the optical head.

FIG. 9 illustrates the light spots on the respective light-receiving elements of the photodetector assembly 36 before the optical head has been adjusted.

FIG. 9 assumes that the sizes of the three light spots for focus error detection are riot minimum though the light E is focused on the information-recording surface 7a of the information recording medium 6. The light spot for tracking error detection is also offset from the boundary (division line) 37c between the light-receiving elements 37a and 37b.

Then, the converging lens 31 is moved along its optical axis so that the sizes of the light spots on the two-division photodetectors 48, 49, and 50 are minimum.

Figure 10:
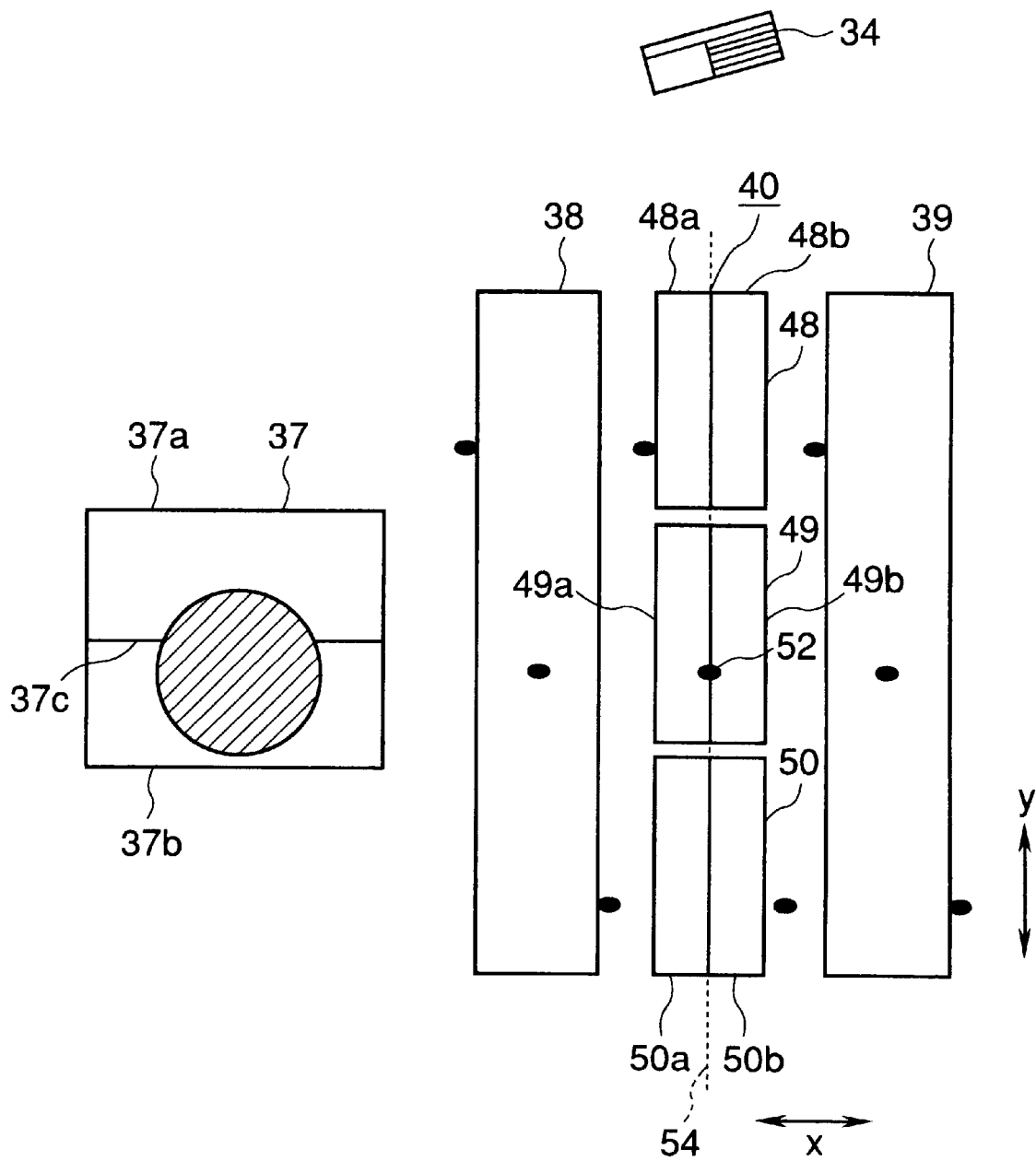
FIG. 10 illustrates the light spots on the two-division photodetectors in the focusing and tracking error detection systems when the optical head is being adjusted.
Figure 11:
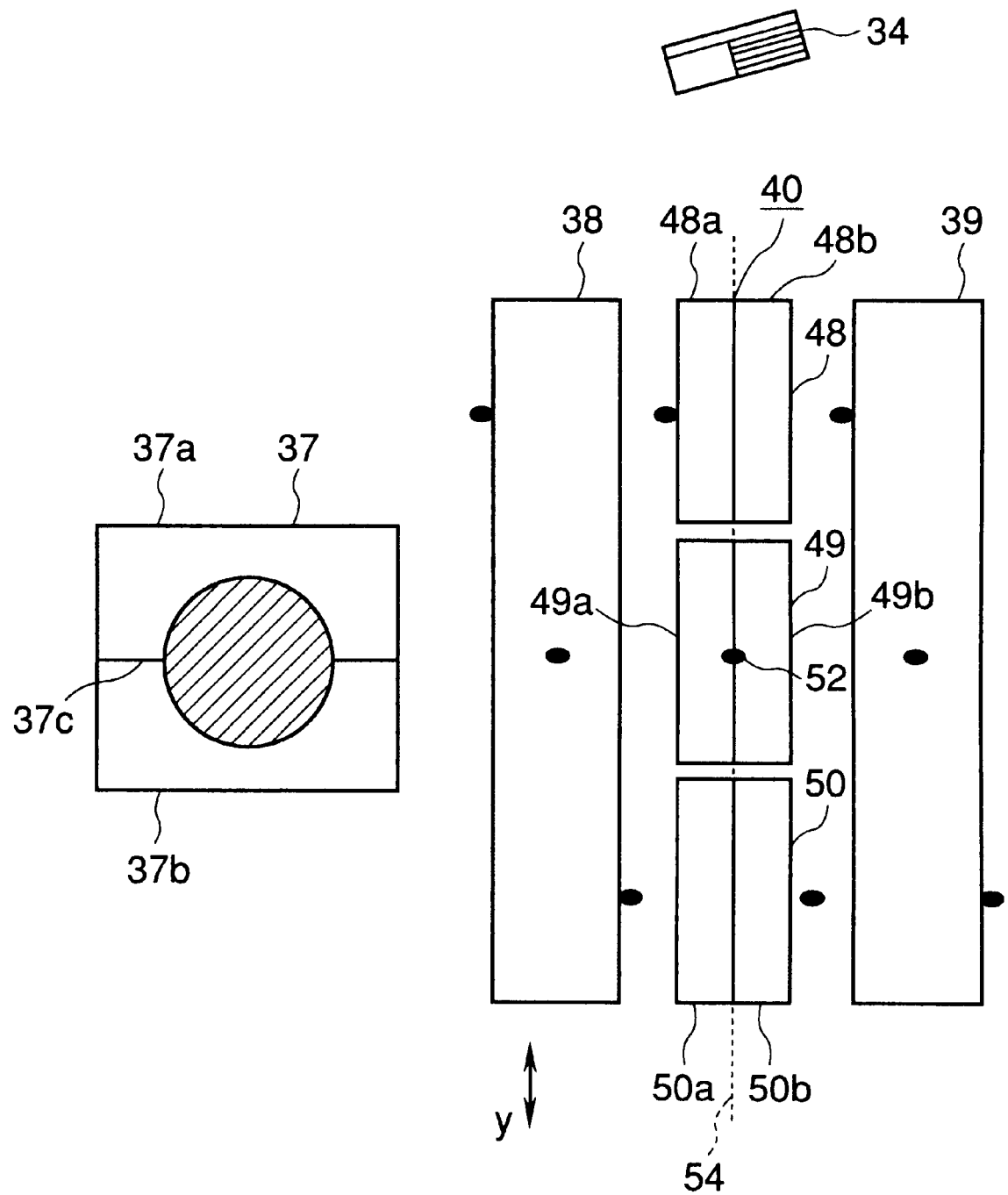
FIG. 11 illustrates the light spots on the photodetectors in the focusing and tracking error detection systems when the optical head is being adjusted but the tracking error detection system has been adjusted.
Figure 12:
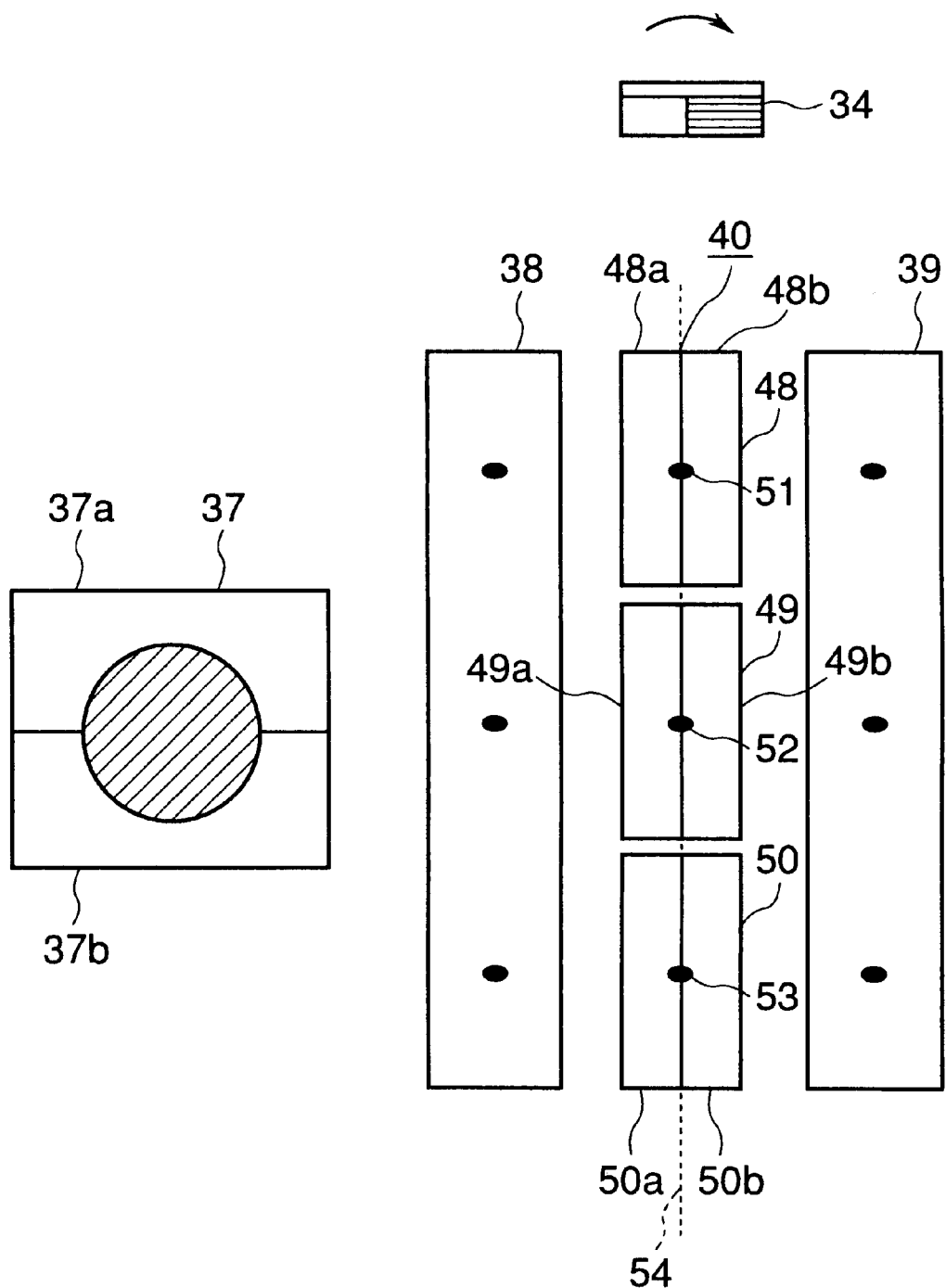
FIG. 12 illustrates the light spots on the photodetectors in the tracking error detection system after the optical head has been adjusted.

Then, as shown in FIG. 10, the package of the photodetector assembly 36 is then moved in the x-direction so as to bring the light beam RFb onto the division line of the two-division photodetector 49. The converged light spot 52 is preferably on the longitudinally middle of the two-division photodetector 49, but at this stage with a very low position accuracy of several tens $\mu$m. Then, as shown in FIG. 11, the photodetector assembly 36 is controllably moved in the y-direction so that the tracking signal TES is zero, thereby bringing the converged light spot 52 accurately at the center of the two-division photodetector 49 in the y-direction. Then, as shown in FIG. 12, the light beam dividing element 34 is rotated so that the converged light spots 51 and 53 are on the division lines of the two-division photodetectors 48 and 50, respectively.

The converged light spot 52 is a light spot that has passed through the transparent flat plate 34b of the light beam dividing element 34, and therefore the position of the light spot 52 is not affected at all by the rotation of the light beam dividing element 34. In this manner, the converged light spots 51 and 53 are easily positioned on the division lines of the two-division photodetectors 48 and 50, respectively, and the three Light beams or the light beam RS1 and the three light beams of the light beam RS2 split by the Wollaston prism 33 are all incident on the photodetectors 38 and 39.

Figure 13:
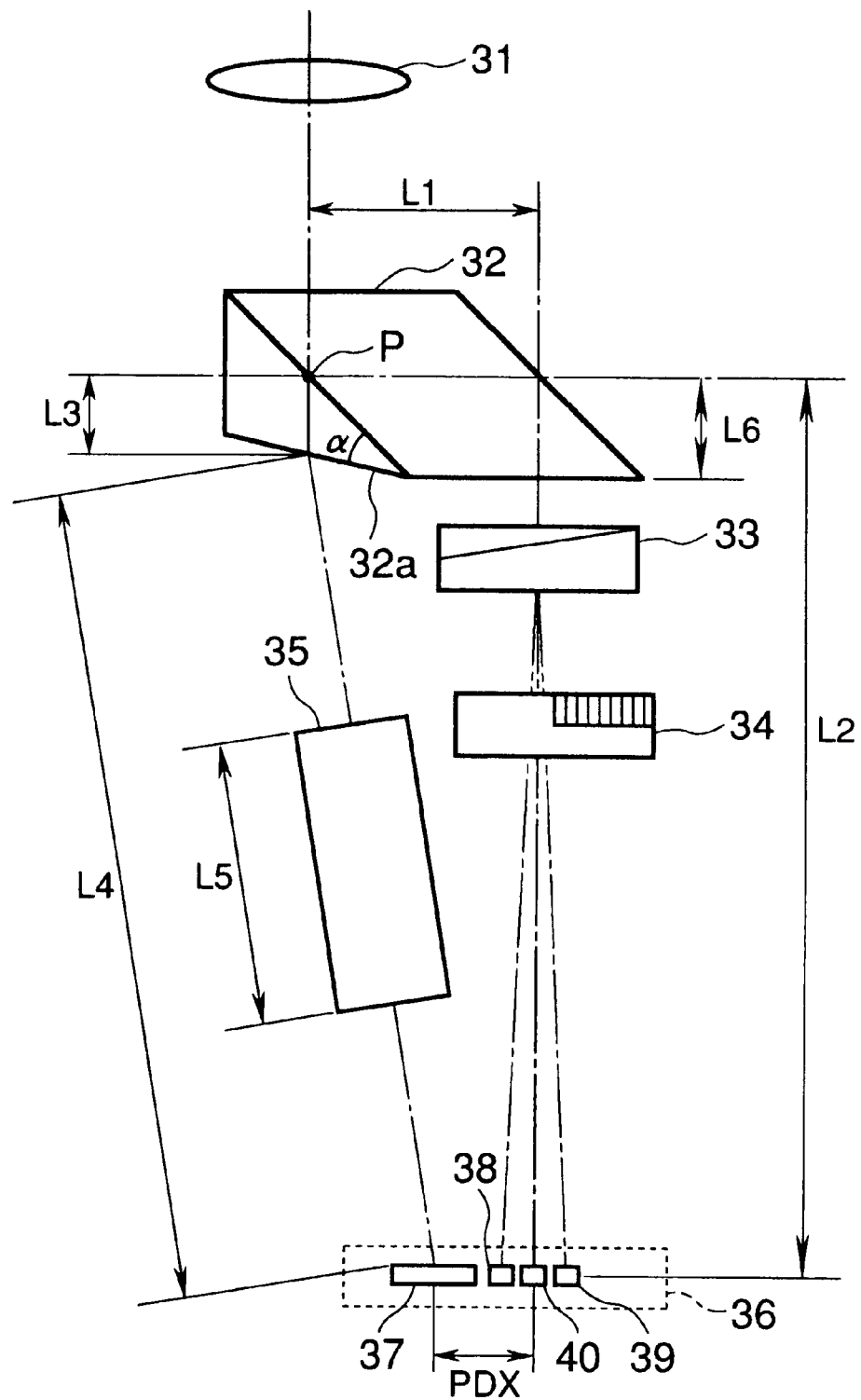
FIG. 13 illustrates the parameters of the optical components.

The function or the transparent flat plate 35 will be described with reference to FIG. 13 in terms of the parameters of the optical components when the first embodiment is applied. FIG. 13 illustrates the parameters of the optical components. We assume that the objective lens 5 has an aperture $NA_{obj}=0.55$, an incident pupil having a diameter of $\phi_{obj}=3$ mm, and a focal length $f_{obj}$ of 3.3 mm, and the converging lens 31 has a focal length fs of 55 mm. The optical distances to the tracking error detection system and to the focus error detection system from point P at which the light beams are branched, are determined as follows:

The positional relation among the converging lens 31, beam splitter 32, and photodetector assembly 36 is determined by the physical distances L1 and L2.

If the physical distances L1 and L2 are $$L1=6 \text{ mm} \tag{3}$$

$$L2=40 \text{ mm} \tag{4},$$

then the optical distance LF from point P to the six-division photodetector 40 in the focus error detection system is expressed as follows:

$$LF=L1/1.5+(L2-X1)+X1/1.5 \tag{5}$$

Where the refractive indices of the glass material for the beam splitter 32, the Wollaston prism 33, and light beam dividing element 34 are assumed to be 1.5, respectively. The optical path is shorter when the light beam passes through beam splitter 32, Wollaston prism 33, and beam dividing element 34 than when the light beam passes through air. The quantity X in Equation (5) is a sum of the physical distance or L6, which is shown in FIG. 13, the thickness of the Wollaston prism 33, and the thickness of the light beam dividing element 34.

The value of X1 may be within a limited range.

If X1=5 mm, then we obtain $$LF=6/1.5+40-5/1.5=42.3 \text{ mm} \tag{6}$$

The light beam for the tracking error detection system is deflected by an inclined light-exiting surface 32a of the beam splitter 32 so that the distance PDX between the six-division photodetector 40 and the two-division photodetector 37 is small. Thus, the light exiting surface 32a of the beam splitter 32 is inclined by an angle $\alpha$.

If the angle $\alpha \approx 35°$ (7), then $$L3 \approx 2.6 \text{ mm} \tag{8}$$

$$L4 \approx 37.5 \text{ mm} \tag{9}$$

The optical distance LT from point P to the two-division photodetector 37 in the tracking error detection system is expressed as follows:

$$LT=L3/1.5+L4-L5+L5/1.5 \approx 2.6/1.5+37.5-7+7/1.5=36.9 \text{ mm} \tag{10}$$

where the length and refractive index of the glass material of the transparent flat plate 35 are 7 mm and 1.5, respectively.

When there is not provided the transparent flat plate 35, the optical distance LT' from point P to the two-division photodetector 37 is given by $$LT'=L3/1.5+L4\approx 2.6/1.5+37.5=39.2 \text{ mm} \tag{11}$$

Thus, from the aforementioned relation, the diameters TSP1 and TSP2 of the light spots on the two-division photodetector 37 of the tracking error detection are given as follows:

$$TSP1=3\times(LF-LT')/55=3\times(42.3-39.2)/55=0.17 \text{ mm } \phi \tag{12}$$

where TSP1 is the diameter of the light spot when the transparent flat plate 35 is not used.

$$TSP2=3\times((LF-LT)/55=3\times(42.3-36.9)/55=0.29 \text{ mm } \phi \tag{13}$$

where TSP2 is the diameter of the light spot when the transparent flat plate 35 is used.

The diameter of the light spot on the two-division photodetector 37 is about, 70% larger than when flat plate 35 is not used, preventing the signal quality from deteriorating due to short term- and long term-positional errors as well as accepting lower adjustment accuracy.

Let's consider the magnification of the light spot on the two-division photodetector 37.

With the arrangement in FIG. 13, the optical, distance LT from point P to the two-division photodetector, 37 in the tracking error detection system is given as follows:

$$LT=L3/1.5+L4+L5/1.5 \approx 2.6/1.5+37.5-2+2/1.5=38.6 \text{ mm} \tag{14}$$

where L5 is the length of the transparent flat plate 35 and is 2 mm. When the transparent flat plate 35 is not used, the optical distance LT' is given by $$LT'39.2 \text{ mm} \tag{15}$$

and the spot diameter TSP1 when the transparent flat plate 35 is not used, is given by $$TSP1=0.17 \text{ mm } \phi \tag{16}$$

The spot diameter TSP2 when the transparent flat plate 35 is used is given as follows:

$$TSP2=3\cdot(LF-LT)/55=3\cdot(42.3-38.6)/55=0.20 \text{ mm } \phi \tag{17}$$

Thus, the use of the transparent flat plate 35 increases the spot diameter by about 20%.

Varying the length L5 of the transparent flat plate 35 allows the spot diameter on the two-division photodetector 37 in the tracking error detection system to vary while maintaining the focus error detection system unaffected. In other words, the spot diameter is a function of the length L5.

The present invention is characterized by the transparent flat plate 35 which magnifies the light spot for tracking error detection by more than 20%. The transparent flat plate 35 of the invention is different from a conventional 0.1 to 1 mm thick light-transmitting plate placed on the light incident surface of the photodetector assembly 36.

Figure 25A:
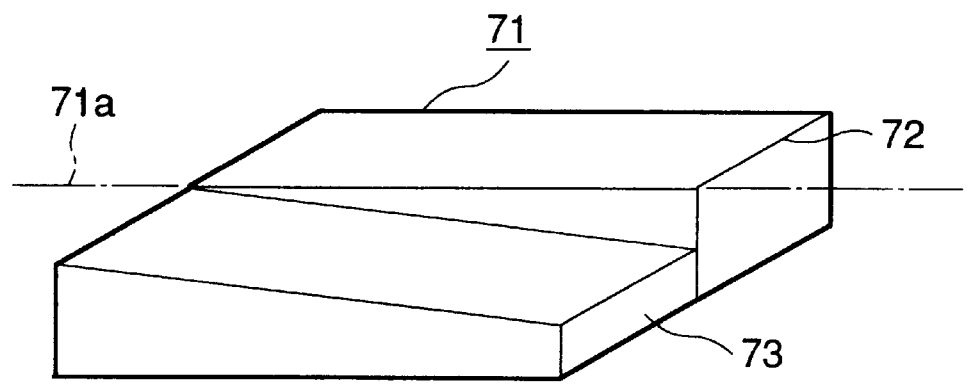
FIG. 25A is a perspective view of the light beam dividing element 71.
Figure 25B:
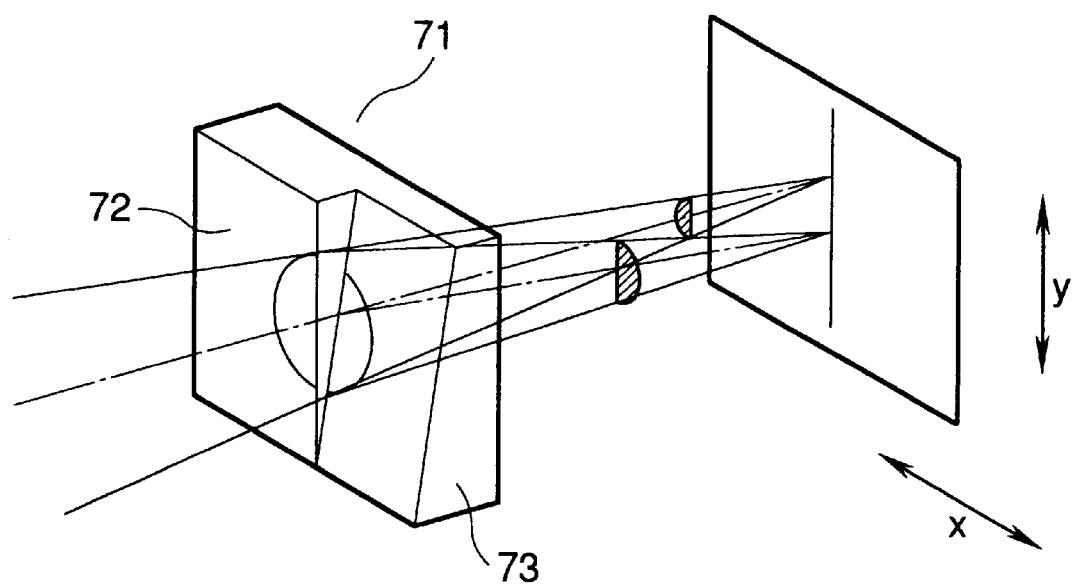
FIG. 25B illustrates how the incident beam is divided into two beams.
Figure 26:
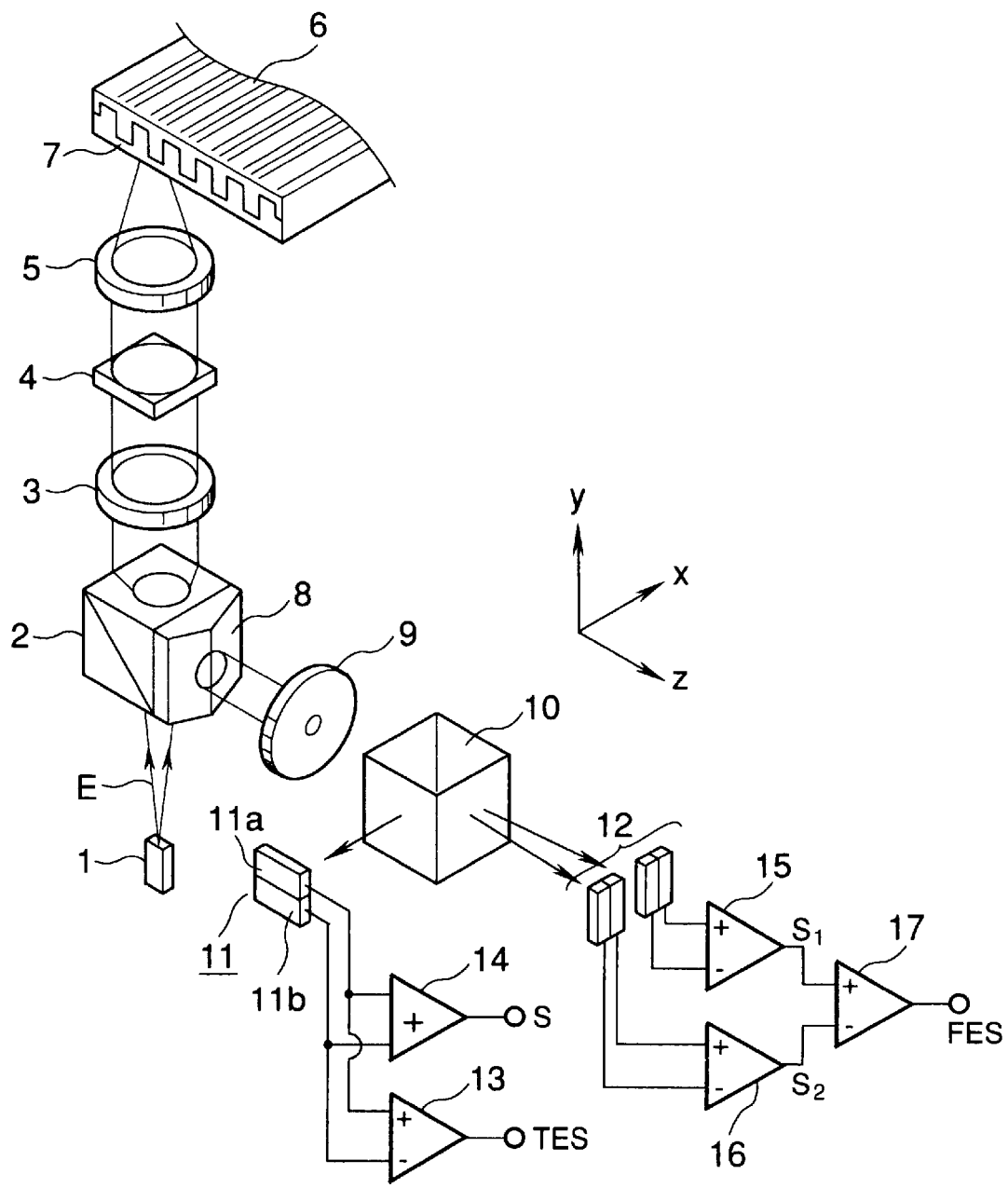
FIG. 26 illustrates a general construction of a prior art optical head.
Figure 27:
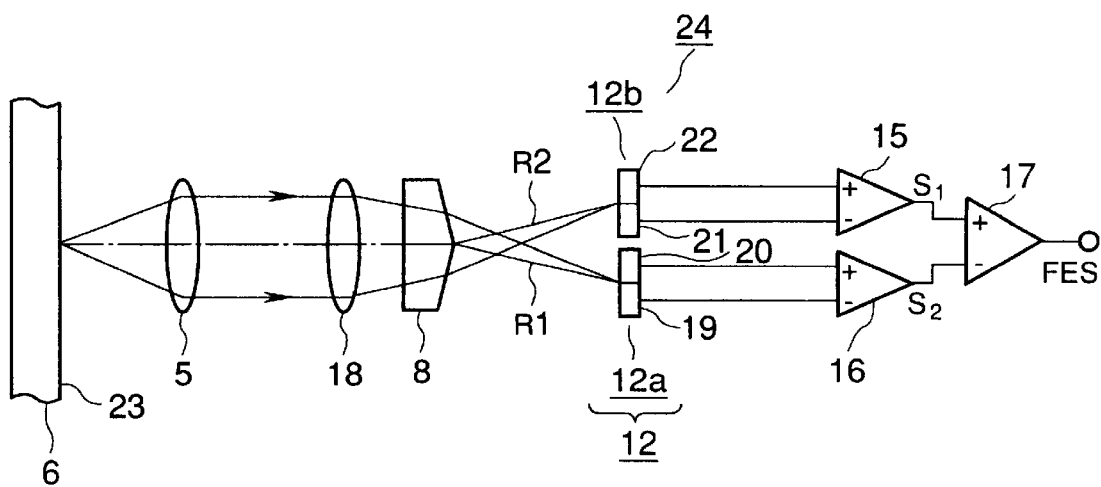
FIG. 27 illustrates the light beam E exactly focused on the information recording medium.
Figure 28:
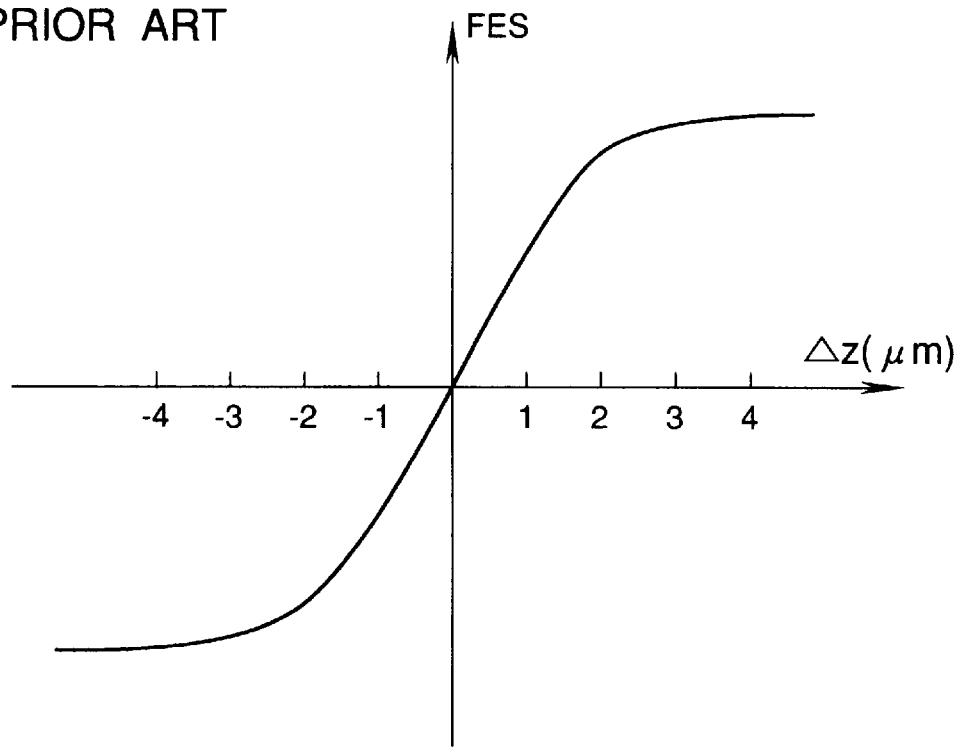
FIG. 28 is a graph illustrating the relation between the focus error Δf and the information-recorded surface of the information recording medium.
Figure 29:
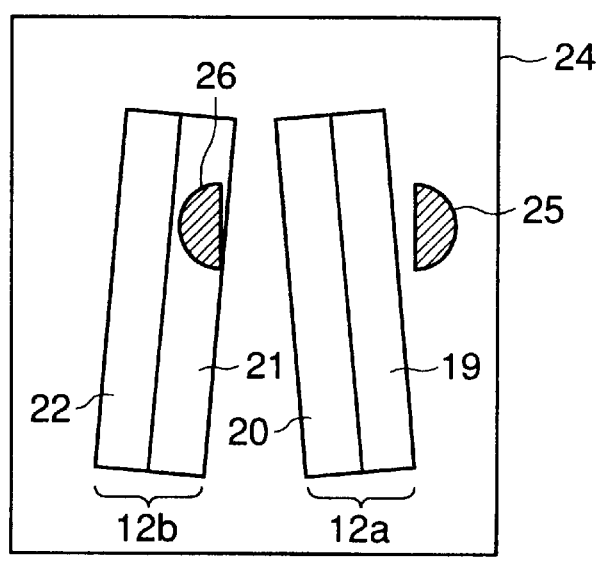
FIG. 29 illustrates the light spots on the two two-division photodetectors of the prior art before adjustment.
Figure 30:
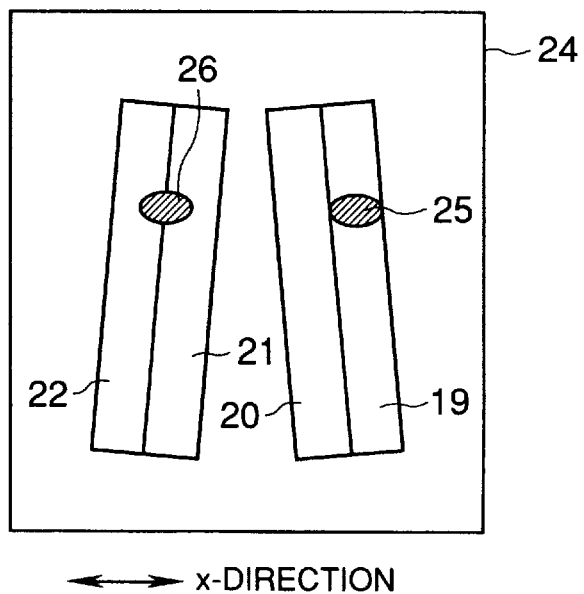
FIG. 30 illustrates the light spots on the two two-division photodetectors when the prior art optical head is being adjusted.
Figure 31:
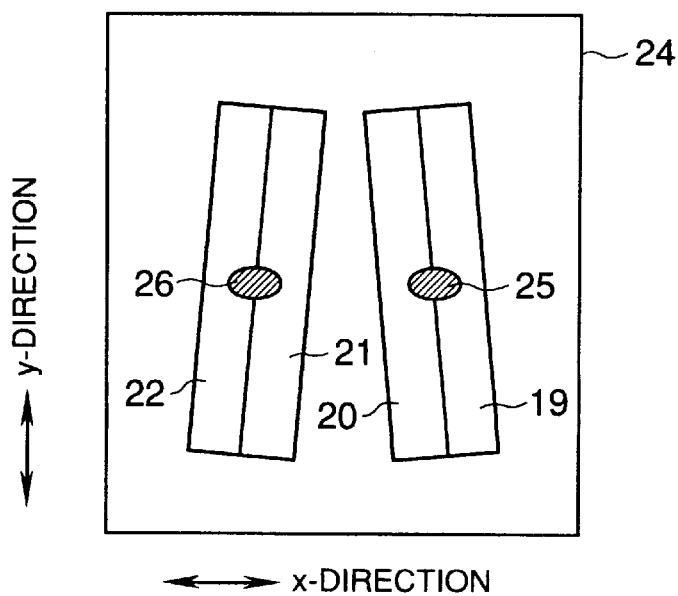
FIG. 31 illustrates the Light spots on the two two-division photodetectors after the prior art optical head has been adjusted.
Figure 32:
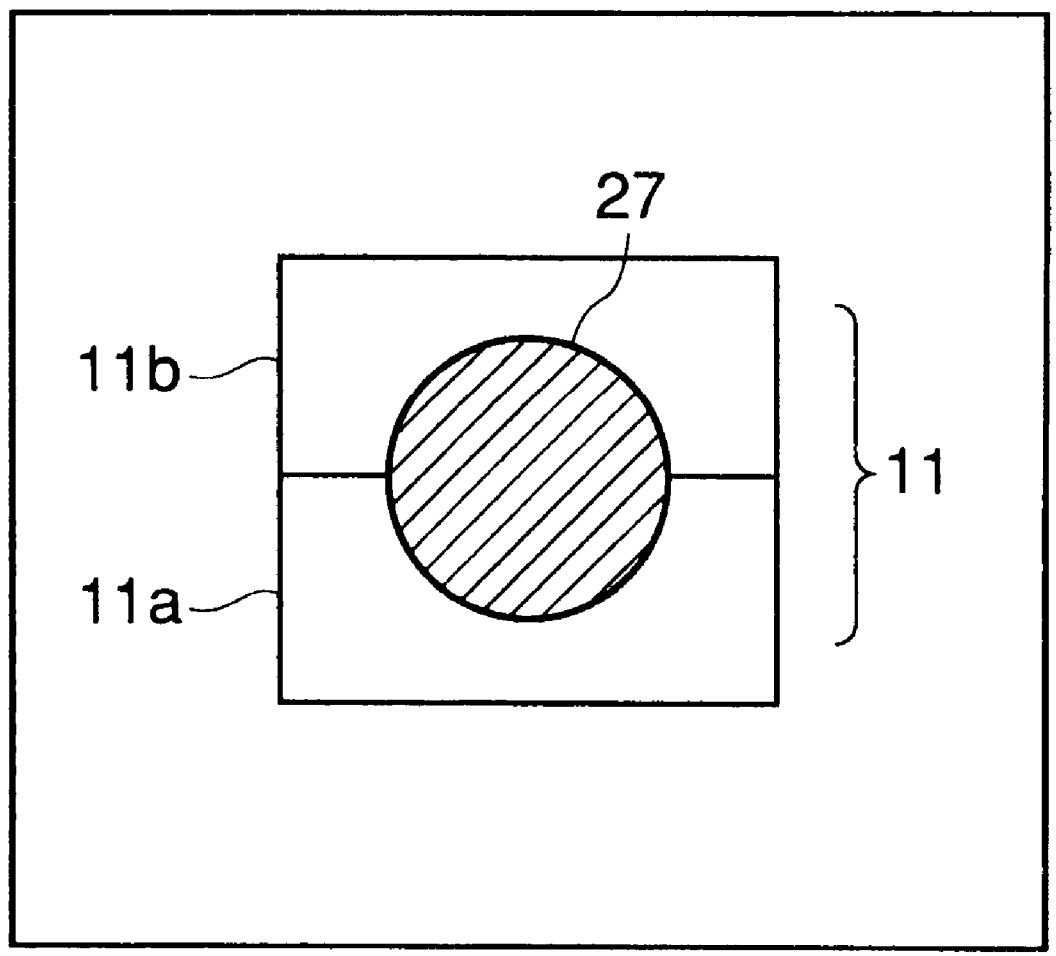
FIG. 32 illustrates the light spot on the two-division photodetector after the prior art optical head has been adjusted.

In the present invention, the light beam dividing element 34 is used in place of the roof prism 8 of the prior art optical head shown in FIG. 25. The light beam dividing element 34, which is rotatable and has a transparent flat plate in its half area, offers the following three major advantages.

One advantage is that the adjustment of the focus error detection system is substantially simplified. Thus, the simplified adjustment reduces the manufacturing cost of the optical head. Another advantage is that the light beam dividing element can be manufactured at lower cost than the prior art roof prism. This is due to the fact that the light beam dividing element can be manufactured by the holography technique or semiconductor processes such as photolithography and etching instead of polishing. The third advantage is that dispersion loss at the boundary between the diffraction grating area 34a and transparent flat plate 34b can be reduced. This is due to the fact that the width of the boundary region between the diffraction grating area 34a and transparent flat plate 34b may be made extremely narrow, for example, less than 10 μm. Thus, the boundary region is called "boundary line."

In FIG. 1, while the light beam dividing element 34 is placed in the focused light beam, the element 34 may be placed in the parallel light beam.

Next, let's consider a case when the wavelength λ of the light emitted from the light source 1 varies.

A change in wavelength causes the locations of the focused spots 51 and 53 to shift on the two-division photodetectors 48 and 50. A change in wavelength causes the light beams RFb and RFc to be differently deflected by the light beam dividing element, so that the locations of the focused spots are shifted on the six-division photodetector 48 and 50. However, three focused spots 51, 52, and 53 are inherently on a straight line and the division lines of the two-division photodetectors 48, 49, and 50 are also on the same straight line. Therefore, the focused spots move along the division lines. Diffraction grating has a constant period or grating and therefore has no lens effect so that the sizes and shapes of the focused spots remain substantially the same. Thus, changes in the wavelength of light emitted from the light source 1 have a negligible effect on the focus error signal FES.

Second Embodiment

Figure 14:
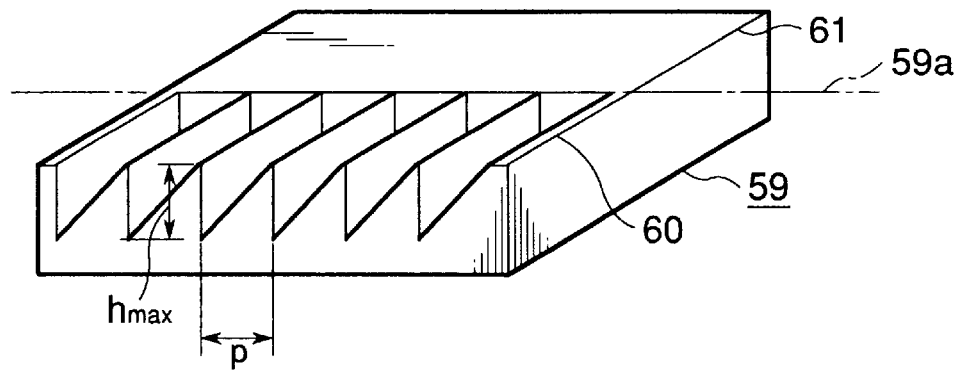
FIG. 14 is a perspective view of a light beam dividing element according to a second embodiment.

The diffraction grating area 34a of the light beam dividing element 34 shown in FIG. 1 includes the grooves having a U-shaped cross section formed in a flat surface. The light beam dividing element 34 may be replaced by a light beam dividing element 59 having a saw-tooth relief construction formed in a flat surface as shown in FIG. 14. The light beam dividing element 59 is formed of a transparent material having a refractive index n, maximum depth hmax of the saw-tooth, and constant period p. The grooves of the diffraction grating extend straight. The boundary line between the diffraction grating 60 and transparent flat plate 61 is substantially straight and substantially perpendicular to the grooves.

The maximum depth hmax of the diffraction grating is approximately given by, $$h\max=\lambda/(n-1) \tag{18}$$

where λ is the wavelength of light emitted from the light source.

If there is no Fresnel loss on the front and back surfaces of the light beam dividing element 59, 100% of the light beam incident upon the diffraction grating 60 is deflected into the first order diffracted light which is the light beam RFa. Thus, the optical head shown in FIG. 1 will not generate the light beam RFc, so that the two-division photodetector 50 is not required and the entire light beam incident on the light beam dividing element 59 can be divided into two beams which are incident upon the two-division photodetectors 48 and 49, respectively.

Third Embodiment

Figure 15:
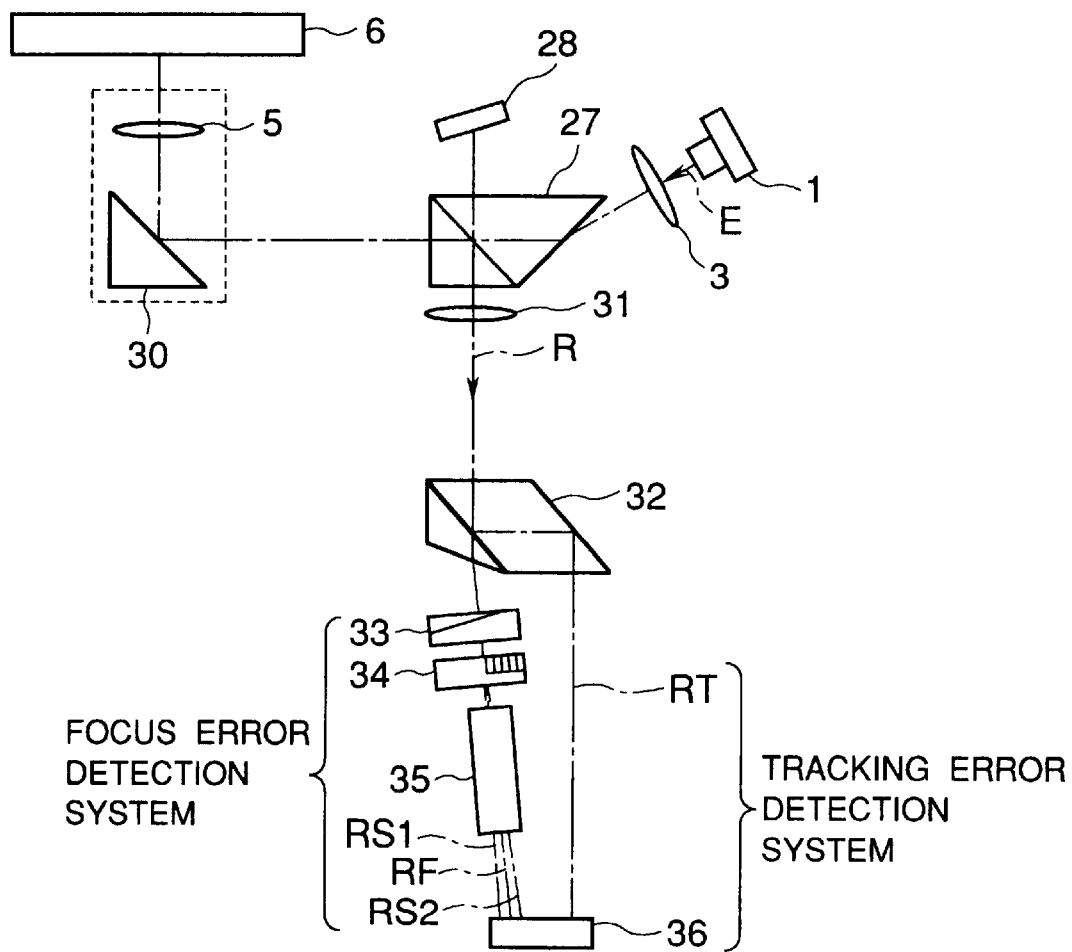
FIG. 15 illustrates a general construction of an optical head according to a third embodiment.

FIG. 15 illustrates a general construction of an optical head according to a third embodiment. Elements similar to those in FIG. 1 have been given the same reference numerals as those in FIG. 1. FIG. 15 (differs from FIG. 1 in that the arrangements of the tracking error detection system and the focus error/information detection system are reversed. The tracking error detection system is not shown in FIG. 15. The transparent flat plate 35 is in the tracking error detection system in FIG. 1 while it is in the focus error detection system in FIG. 15.

The six-division photodetector 40 for the focus error detection of the photodetector assembly 36 is arranged at the focal point of the converging lens 31. Therefore, in the tracking error detection system, the light beam is first focused and then the divergent light beam after focusing is incident on the two-division photodetector 37. In this case, too, there is substantially difference in optical distance between the focus error detection system and tracking error detection system just as in FIG. 1, so that a magnified diameter of light spot is obtained on the two-division photodetector 37 in the tracking error detection system.

Fourth Embodiment

Figure 16:
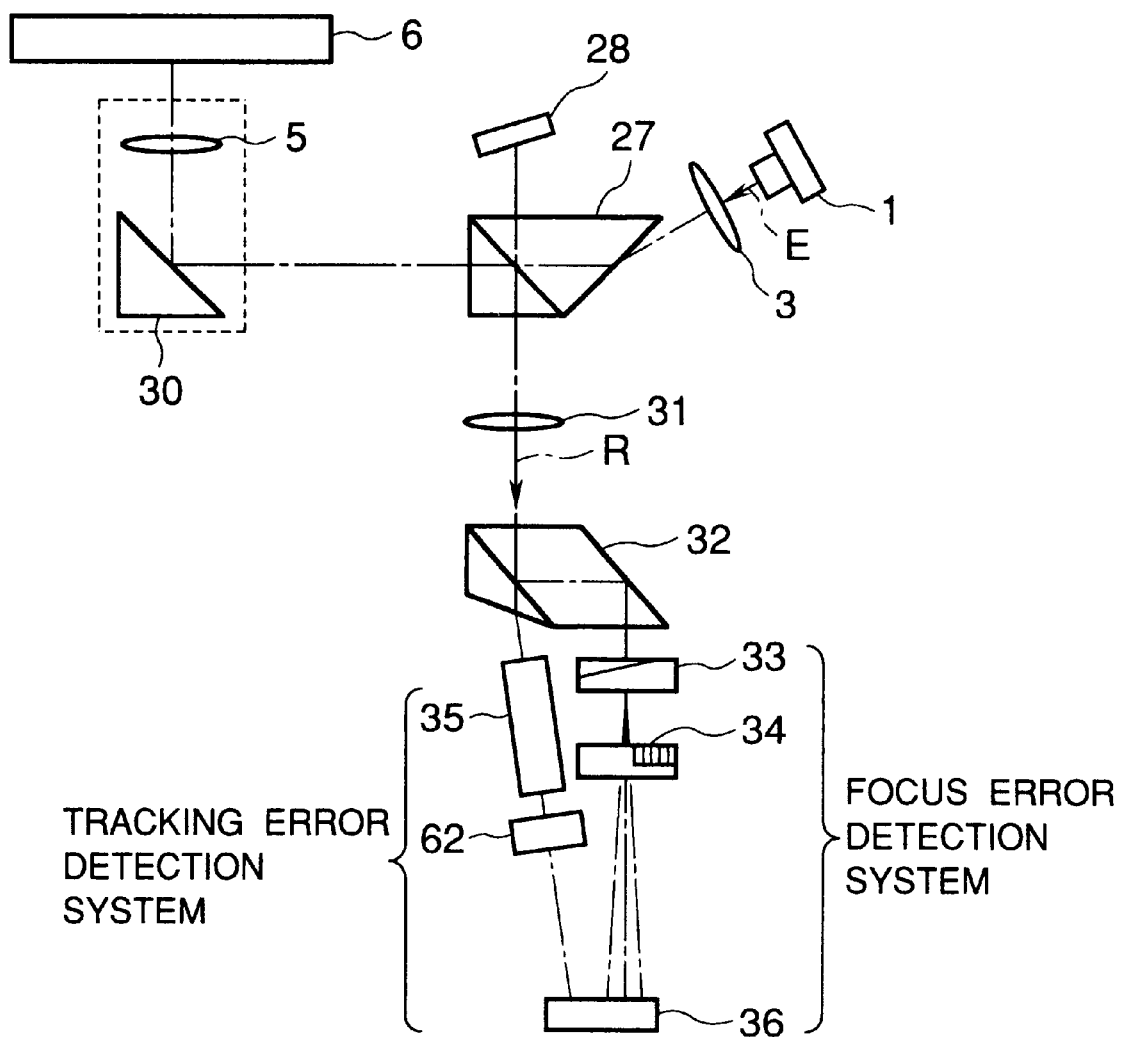
FIG. 16 illustrates a general construction of an optical head according to a fourth embodiment.

FIG. 16 illustrates a general construction of an optical head according to a fourth embodiment. The fourth embodiment is characterized by a cylindrical lens 62 inserted between the transparent flat plate 35 and the photodetector assembly 36 in the tracking error detection system.

Figure 17:
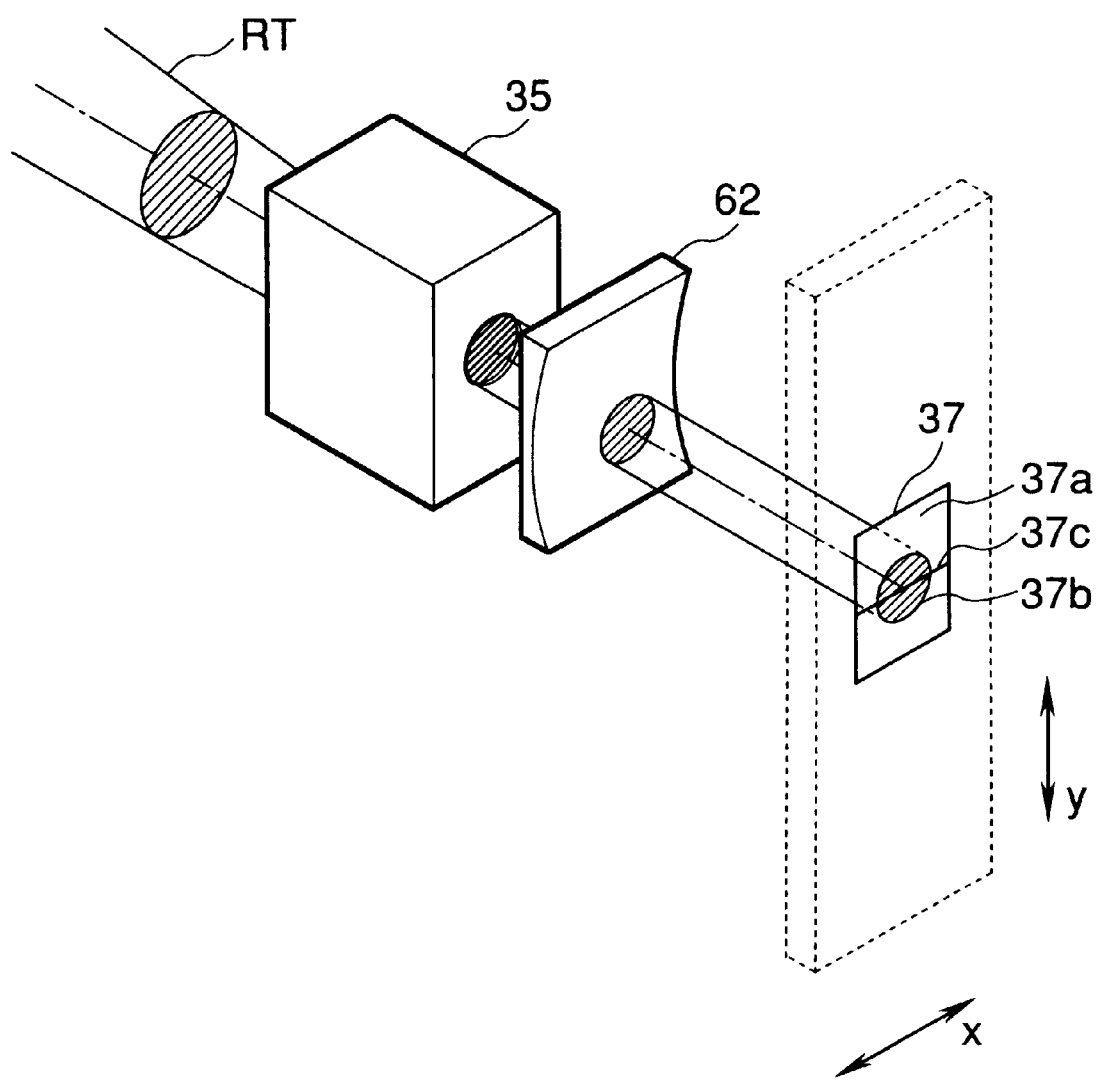
FIG. 17 illustrates the light spots on the photodetectors in the tracking error detection system of a fourth embodiment.

The fourth embodiment is particularly advantageous in that the focal length of the converging lens 31 may be shorter and the distance from the beam splitter 32 to the photodetector assembly 36 may also be shorter. In other words, the fourth embodiment lends itself to the miniaturization of the optical head. Referring to FIG. 1, if a larger diameter of the light spot on the two-division photodetector is desired, then the length or distance (indicated at L5 in FIG. 13) of the transparent flat plate 35 needs to be longer in the direction parallel to the RT. However, if the length of the transparent flat plate 35 is long, for example, L5=20 mm, then the long distance presents a problem of a mounting space that the transparent flat plate 35 cannot be comfortably mounted. This problem can be solved by the construction shown in FIG. 16. Referring to FIG. 16, astigmatism-producing means such as a cylindrical lens 62 is inserted. The cylindrical lens 62 enlarges the light spot in the direction perpendicular to the division lines between the light receiving elements 37a and 37b, the light spot being elliptical as shown in FIG. 17.

This construction accommodates some positional errors of the light spot in the y-direction of the photodetector when adjusting the photodetector assembly 36, and prevents reliability of the tracking error signal from decreasing due to positional errors occurring over time. The curvature of the cylindrical surface of the cylindrical lens 62 can be varied to change the size of astigmatism, allowing adjustment of the spot size on the two-division photodetector 37 at will.

Fifth Embodiment

Figure 18:
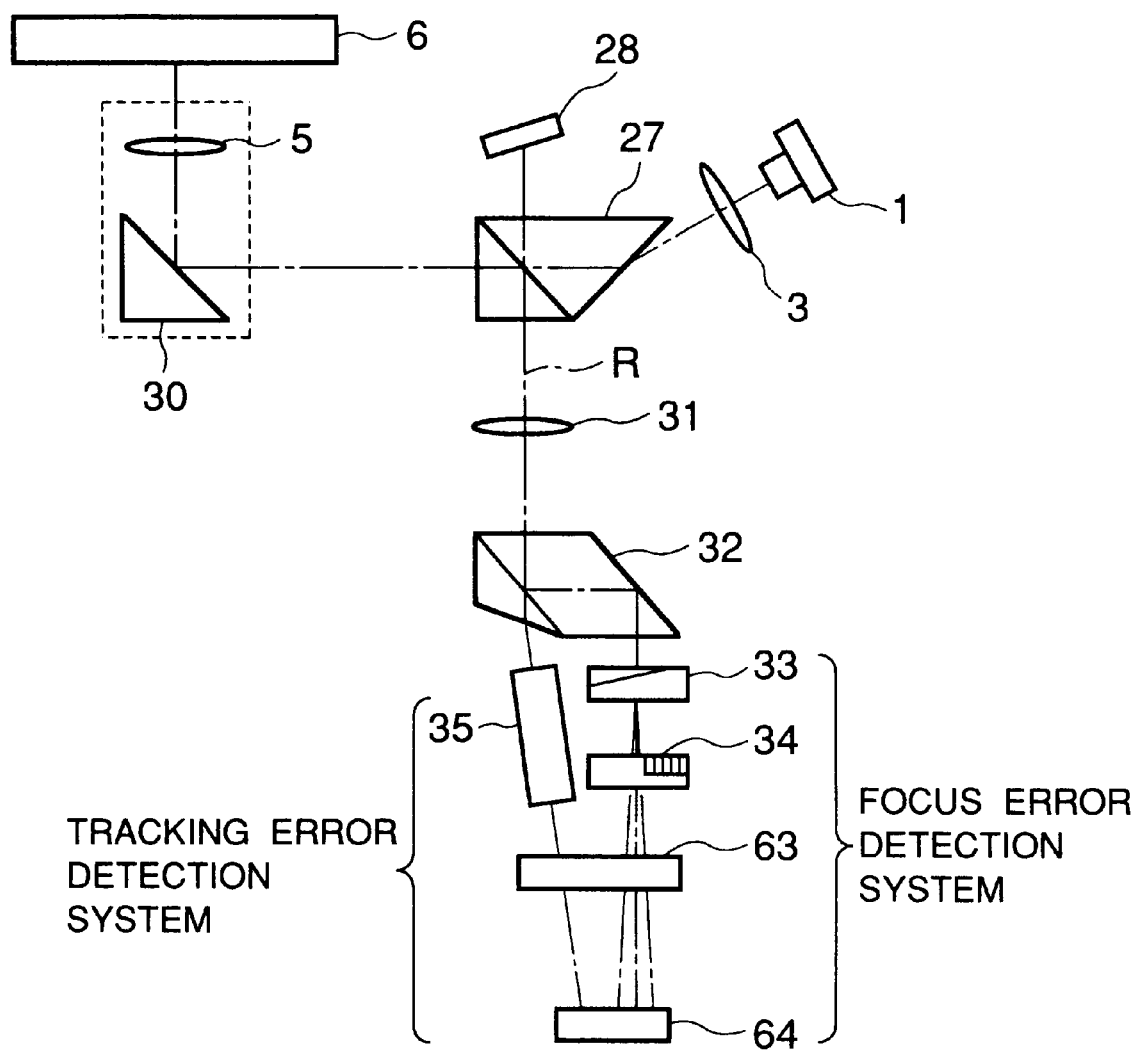
FIG. 18 illustrates a general construction of an optical head according to a fifth embodiment.
Figure 19:
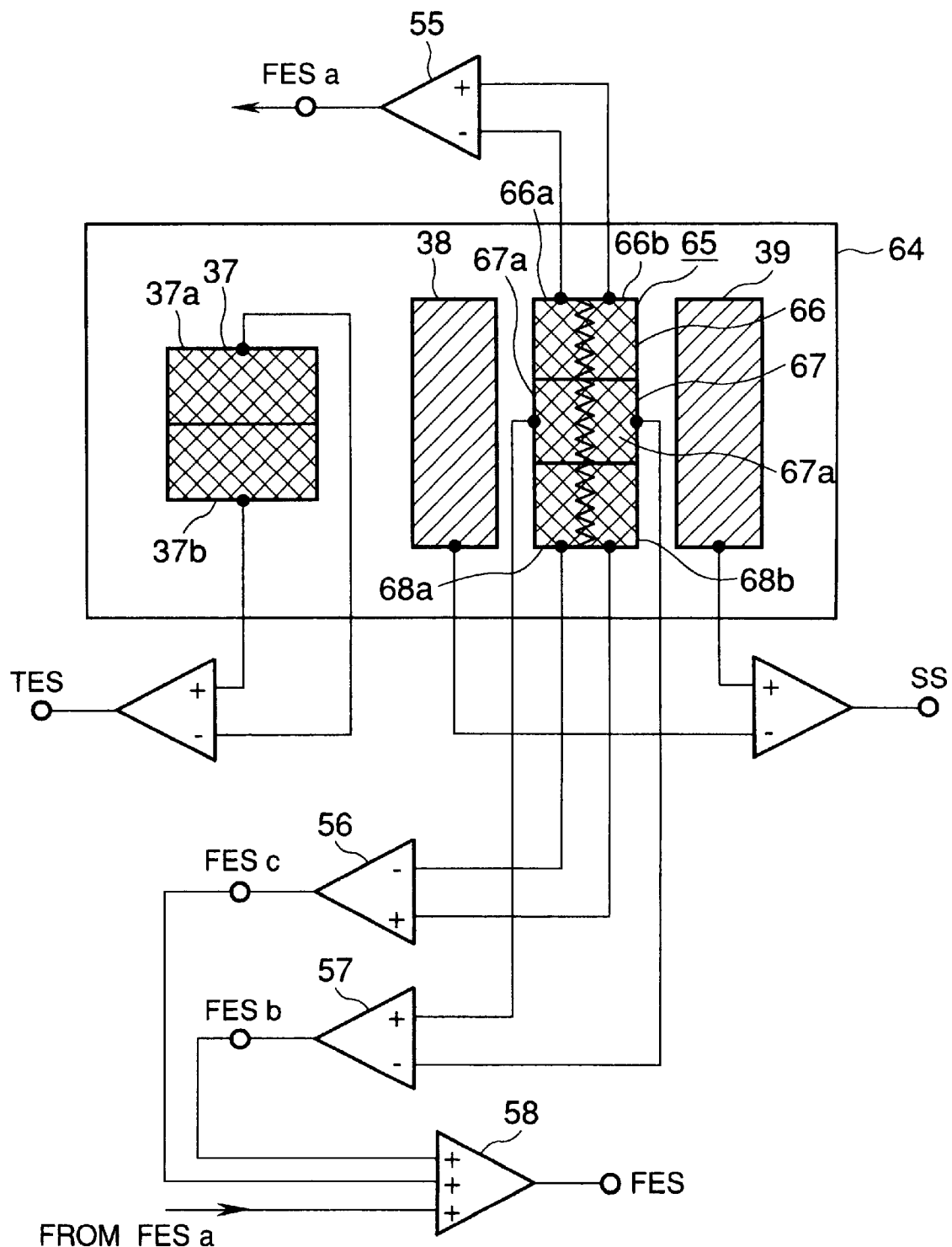
FIG. 19 illustrates the light receiving elements in the photodetector and operational circuits according to the fifth embodiment.

FIG. 18 illustrates a general construction of an optical head according to a fifth embodiment. Referring to FIG. 18, a photodetector assembly 64 receives the light from astigmatism-generating means 63 such as a cylindrical lens. The fifth embodiment is of the same construction as that shown in FIG. 2 except a two-division photodetectors 66, 67, and 68 for receiving the light beams RFa, RFb, arid RFc, respectively. Each of the two-division photodetectors 66, 67, and 68 includes two halves divided by division lines in the form of a triangular wave. The division lines may be in the form of other shape such as a sinusoidal wave as shown in FIG. 20B or a saw-tooth wave as shown in FIG. 20C. The two-division photodetectors 66, 67, and 68 include two light-receiving elements 66a and 66b, 67a and 67b, and 68a and 68b, respectively, which are disposed in a plane perpendicular to the optical axis R.

Figure 20A:
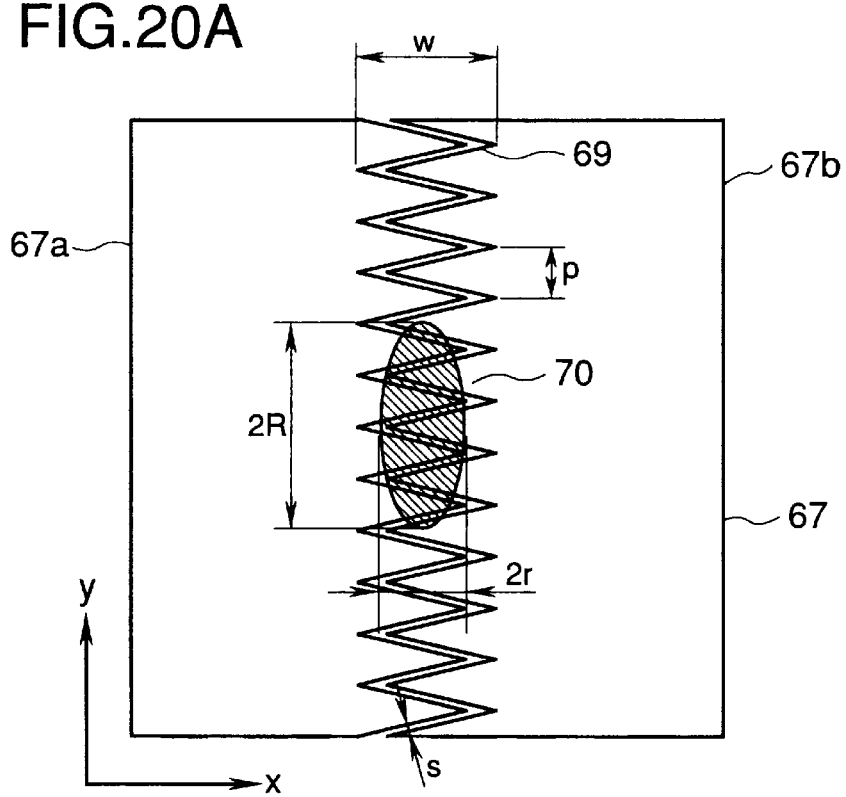
FIG. 20A illustrates the light spot 70 of the reflected light return RFb on the two-division photodetector 67 of the focus error detection system of the fifth embodiment when the light E emitted from the light source is focused on the information recording surface of the information recording medium 6.
Figure 20B:
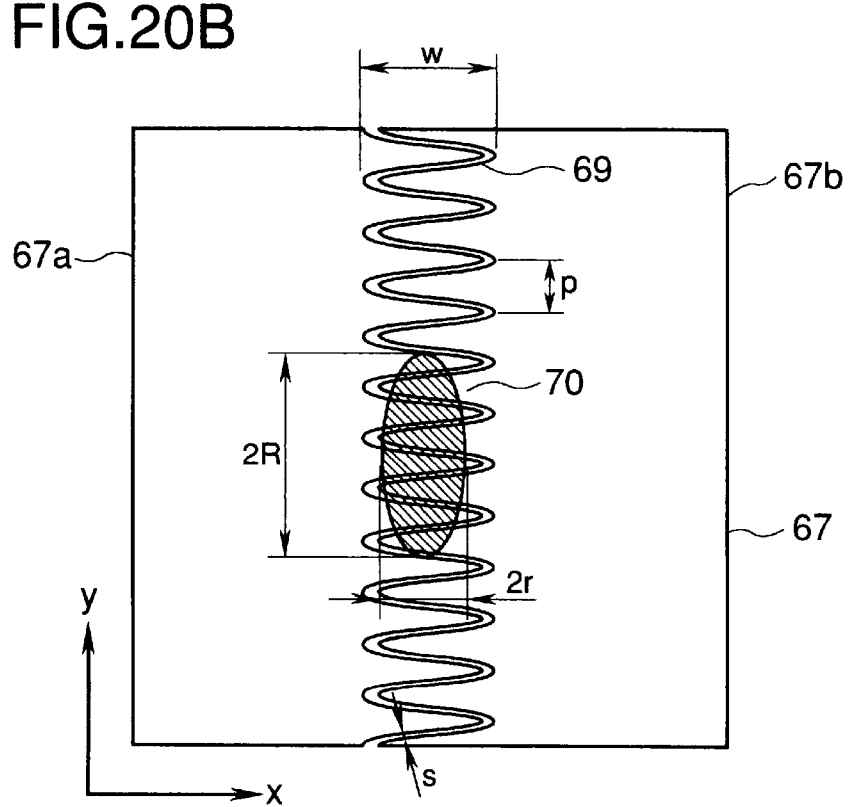
FIG. 20B illustrates two-division photodetector of the fifth embodiment having light receiving surfaces divided by a sinusoidal division line.
Figure 20C:
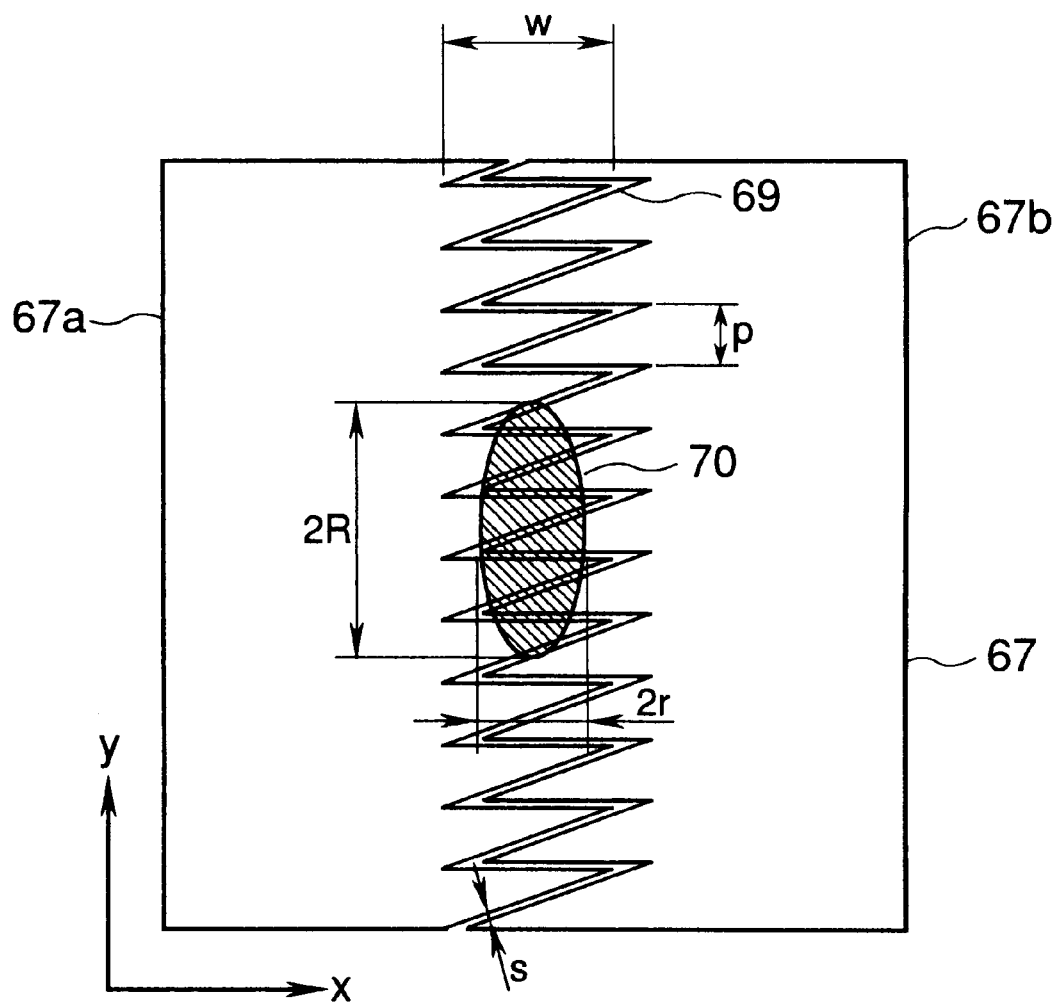
FIG. 20C illustrates two-division photodetector of the fifth embodiment having light receiving surfaces divided by a saw-tooth division line.

FIG. 20A illustrates the light spot 70 of the light beam RFb on the two-division photodetector 67 in the focus error detection system when the light E emitted From the light source is focused on the information recording surface 7a of the information recording medium 6. The two-division photodetector 67 includes the light-receiving elements 67a and 67b divided by a boundary line or division line 69 in the shape of a triangular wave.

A term "division area" is used in the specification to cover an area that includes the triangular wave. The division area extends in a direction substantially parallel to the boundary line 34c between the diffraction grating area 34a and the transparent flat plate 34b of the light beam dividing element 34. Assuming that the division line 69 has a width s sufficiently smaller than the size of the light spot on the two-division photodetector and has a period p of a triangular wave, the points on the division line 69 in the x-y coordinate are expressed as follows:

$$y = (p/w)x + 2np \text{ for } n=0, 2, 4, 6, \tag{19a}$$

$$y = -(p/w)x + (2n-1)p \text{ for } n=1, 3, 5, 7, \tag{19b}$$

$$-w/2 \leq x \leq w/2$$

where the origin of the x-y coordinate is on the center line of the boundary area. Equations (19a) and (19b) are also applied to two other two-division photodetectors 66 and 68. While the boundary line 69 is a triangular wave in FIG. 20A. The photodetector used in this type of apparatus is typically in the form of a silicon photodiode, which is usually fabricated by first writing a pattern of a light receiving area in the mask then the mask pattern is transferred to the substrate so as to form the light receiving area. In this type of fabrication, the mask pattern of a triangular wave cannot be accurately transferred to the substrate. The edge portions of the triangular wave are somewhat rounded so that the overall resultant shape is actually substantially a sinusoidal wave.

Referring again to FIG. 20A, the light spot 70 is almost fully converged in the x-direction and is on the boundary line 69, but is riot fully converged in the y-direction due to the effect of the astigmatism generating means 63. Thus, the diameters 2R and 2r of the tight spot 70 in the x-direction and y-direction, respectively, are sufficiently large compared to the period p of the triangular wave.

Next, the operation of focus error detection will be described. It is assumed that the two-division photodetector 67 has been adjusted so that when the light E emitted from the light source 45 is focused on the information recording surface 7a, (1) the light spot 70 of the light beam RFb, converged in the x-direction, is in the division area of the two-division photodetector 67 and (2) the outputs from the light-receiving elements 67a and 67b are the same.

The astigmatism generating means 63 causes the spot diameter 2R to be larger than the period p of the triangular wave. Therefore, the focus error signal FESa will not vary even if the two-division photodetector 67 moves in the y-direction.

Figure 21:
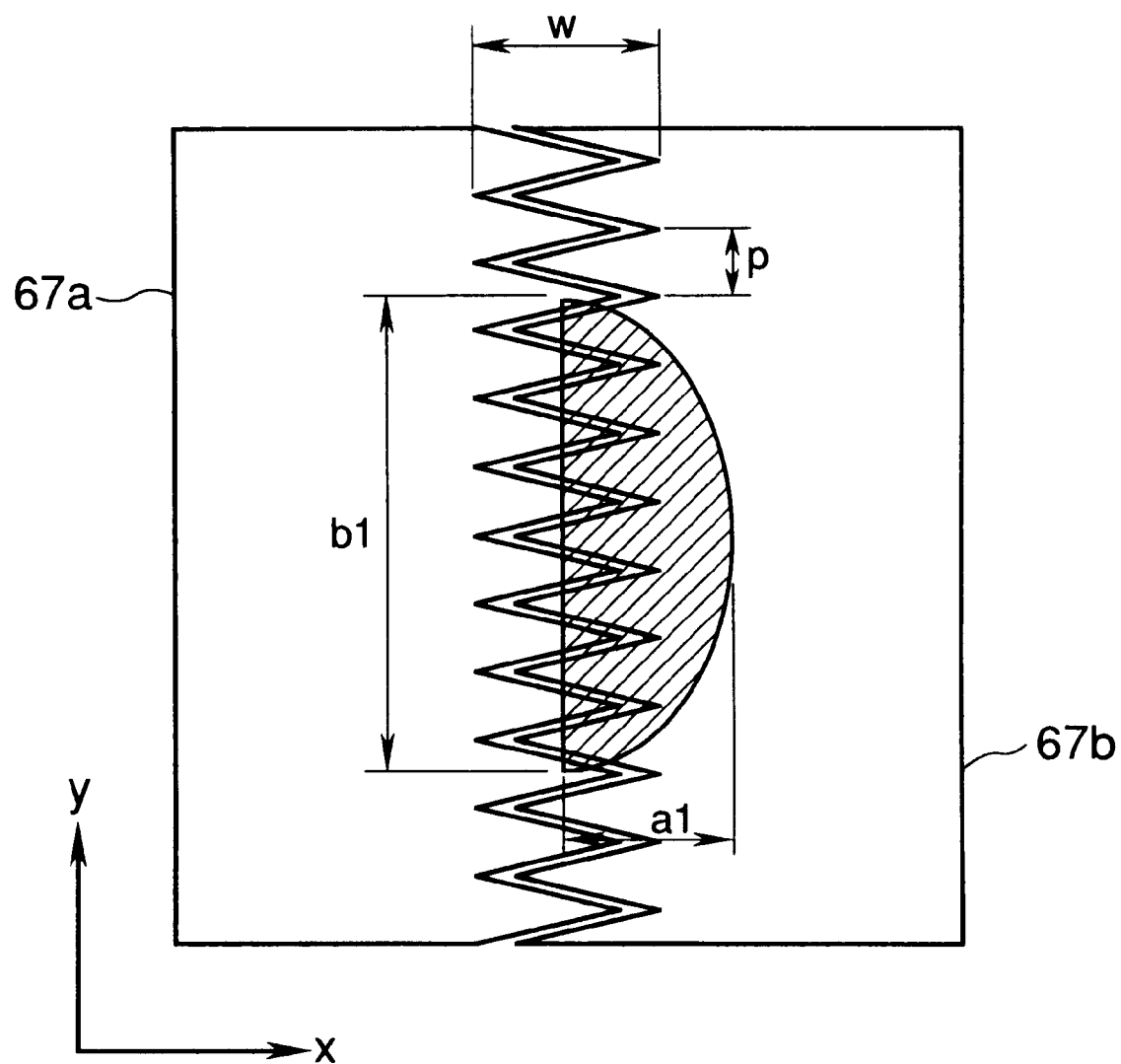
FIG. 21 illustrates the light spots on the photodetectors in the focus error detection system when the information recording surface of the information recording medium is closer to the objective lens than the focal point.

When the information recording medium 6 moves closer to the objective lens 5 than the focal point of the lens 5, the light beam RFb enters the two-division photodetector 67 before it is converged in the x-direction. Thus, as shown in FIG. 21, the light beam RFb is incident more on the light receiving element 67b than on the light receiving element 67a. The light spot has a dimension b1 in the y-direction and a dimension a1 in the x-direction.

Figure 22:
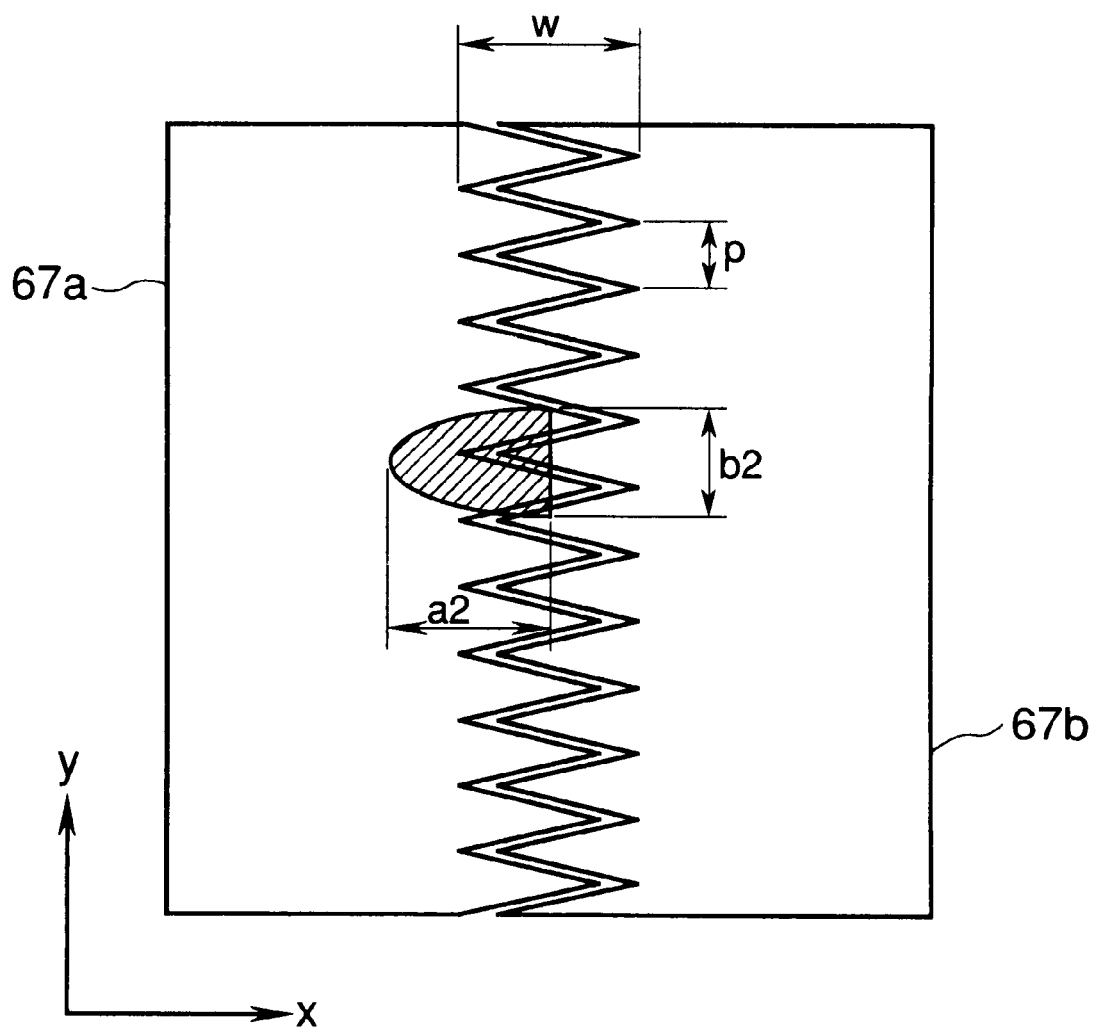
FIG. 22 illustrates the light spot on the photodetectors in the focus error detection system when the information recording surface of the information recording medium is farther from the objective lens than the focal point.

When the information recording medium 6 moves farther away from the objective lens 5 than the focal point of the lens 5, the light beams RFb is focused in front of the two-division photodetector 67. Thus, as shown in FIG. 22, the tight beam RFb is incident more on the light receiving element 67a than on the light receiving element 67b. The light spot has a dimension b2 in the y-direction and a dimension a2 in the x-direction.

The above operation also applies to the light beams RFa and RFc incident upon the two-division photodetectors 66 and 68, respectively. The two-division photodetectors 66 and 68 yield focus error signals FESa and FESC, respectively. Then, the three signals FESa, FESb, and FESc are combined into the focus error signal FES just as in the first embodiment. The adjustment procedure in the fifth embodiment is exactly the same as that in the first embodiment.

The "linear zone" of the focus error detection system, which includes a two-division photodetector having its division line in the shape of a triangular wave, will be described. In practice, the manufacturing process of the two-division photodetector places limitations on the width s (FIG. 20A) of the boundary area of the two-division photodetector, so that the width s cannot be less than a certain minimum value. Consequently, the period p of the triangular wave cannot be less than a certain minimum value.

For example, if the width w of the boundary area is to be 50 μm, the required period p of the boundary area will be more than about 30 μm for a boundary line having a minimum width s=5 μm.

Figure 23:
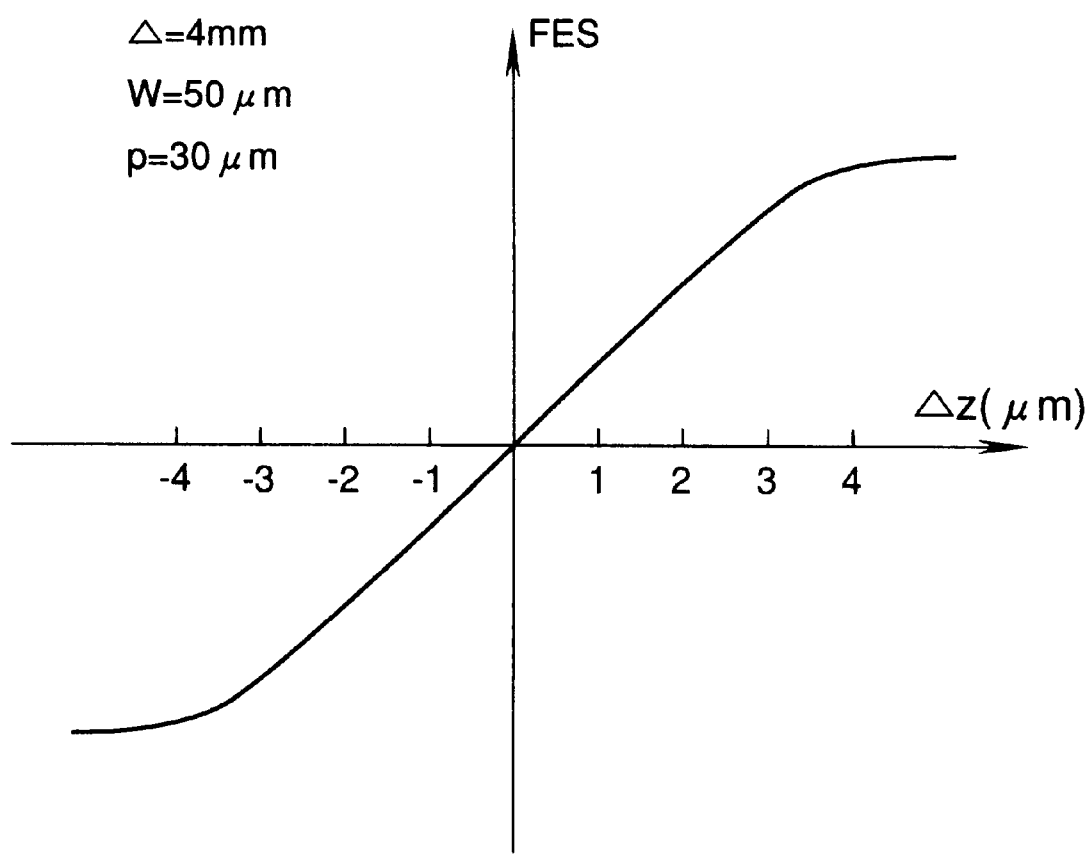
FIG. 23 illustrates the relation between the deviation from the focal point and the corresponding focus error signal.

Therefore, it is necessary to design the astigmatism generating means 63 so that the diameter 2R of the light spot on the six-division photodetector 65 in the y-direction is sufficiently large. FIG. 23 illustrates the relations between deviations from the focal point and the corresponding focus error signal FES when the numerical aperture of the objective lens 4 is 0.55, the aperture of the condenser lens 31 is 0.029, the diameter of the light beam is 3.3 mm, the astigmatic difference Δ is 4 mm, the width w of the boundary area is 50 μm, and the period p of the boundary area is 30 μm.

With this condition, when the light E is substantially focused on the information recording surface of the information recording medium 6, the movement of the six-division photodetector 65 in the y-direction has little or no effect on the focus error signal FES. The "linear zone" may be obtained which ranges from 5 to 6 μm. This range is more than twice as wide as when a two-division photodetector having a straight boundary line with a width s=5 μm is used.

Thus, a two-division photodetector having a boundary line in the form of a triangular wave further offers the following advantages. The frequency response characteristic of the reproduced information is improved when the outputs of the two-division photodetector is used for signal reproduction. The focus error detection characteristic is less sensitive to the amount of light incident upon the two-division photodetector.

The aforementioned advantages result from the following facts. The division lines of photodetectors 66, 67, and 68 in the form of a triangular wave, substantially saw-tooth wave, or substantially sinusoidal wave function to widen the effective width of the division line while still maintaining the same physical width s, effectively increasing the ratio of the size of light spots on the two-division photodetectors to the width s of the division line. Therefore, the amount of light incident upon the boundary line does not represent a large percentage of the total amount of light incident on the photodetector, most of the light incident upon the two-division photodetector being efficiently converted into an electrical signal. Further, a depletion region of a sufficient size is developed also near the boundary line, so that the carriers generated by photoelectric conversion near the boundary line are quickly directed outside of the two-division photodetector and increases in the amount of incident light will not significantly disturb the depletion region.

Just as the first embodiment, the fifth embodiment also provides the following advantages:

(1) the adjustment of the focus error detection system can be performed very easily, (2) the light beam dividing element can be manufactured at lower costs, and (3) the dispersion loss of the signal light in the boundary area of the light beam dividing element is extremely small.

Sixth Embodiment

Figure 24:
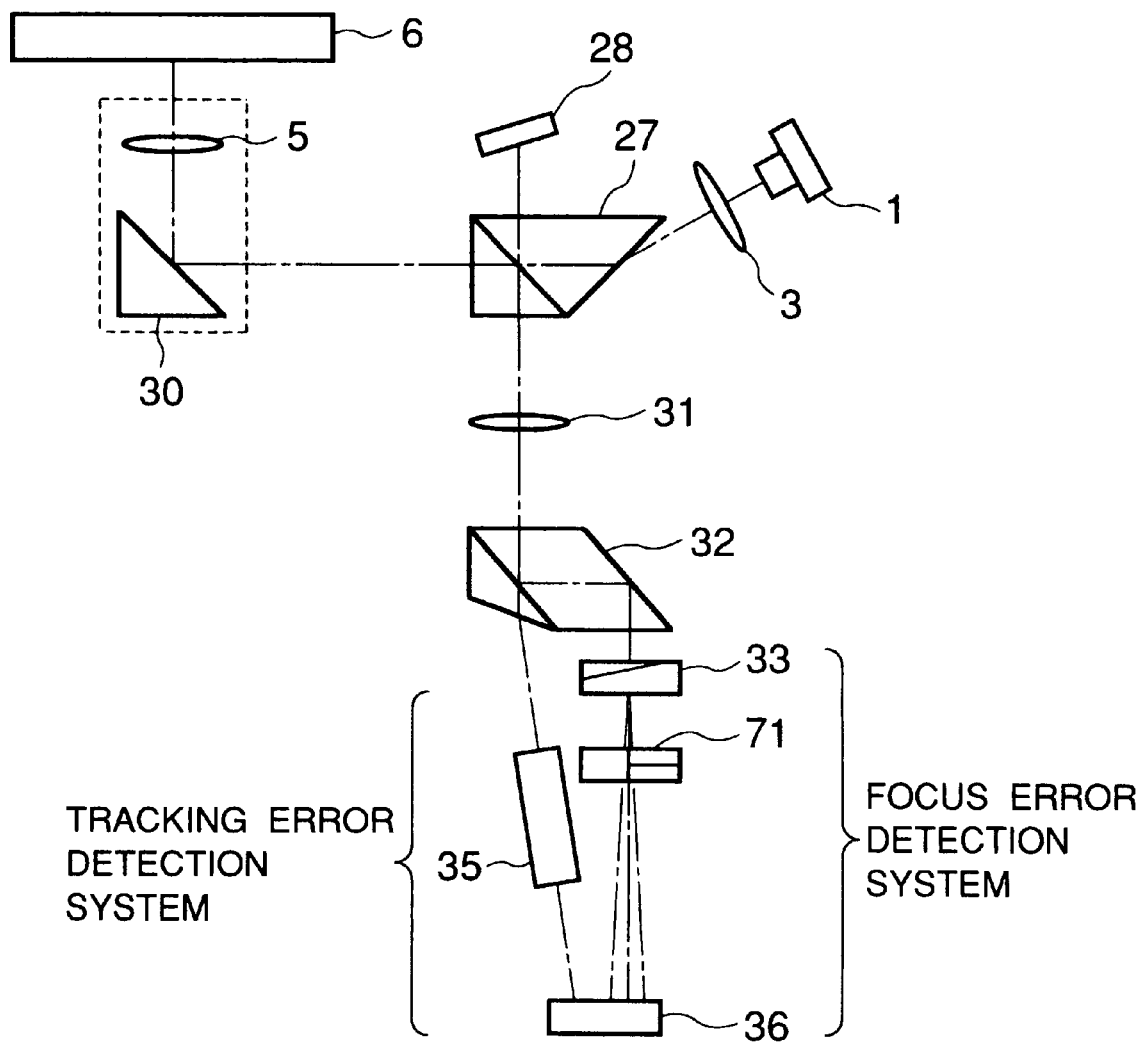
FIG. 24 illustrates a general construction of an optical head according to a sixth embodiment.

FIG. 24 illustrates a general construction of an optical head according to a sixth embodiment.

The sixth embodiment is characterized in that the light beam dividing element 34 shown in FIG. 1 is replaced by a light beam dividing element 71 having a transparent flat plate 72 on one half of the element 71 and a wedge-shaped element 73 on the other. The transparent flat plate 72 and the wedge-shaped element are bounded by a straight line perpendicular to the x-direction. The wedge-shaped element 73 causes the light passing therethrough to deflect.

FIG. 25 is a perspective view of the light beam dividing element 71. The element 71 is made of a transparent material having a refraction index n. The boundary between the transparent flat plate 72 and wedge-shaped element 73 extends in the y-direction perpendicular to the x-direction. The entire light beam incident upon the wedge-shaped element 73 is deflected into the light beam RFc. Therefore, the light beam RFa is not produced if the light beam dividing element 71 is used in the optical head shown in FIG. 1 and the light beam RFc is incident upon the two-division photodetector 50 (FIG. 7). Therefore, the two-division photodetector 48 is not required and the light beam passing through the light beam dividing element 71 may be directed to the two two-division photodetectors 49 and 50, respectively. The light beam dividing element 71 can also be used in place of the light beam dividing elements 34 used in the thin the third, fourth, and fifth embodiments to obtain the same results.

The invention being thus described, it will be obvious that the same may be varied in many ways. Such variations are riot to be regarded as a departure from the spirit and scope of the invention, and all such modifications as would be obvious to one skilled in the art are intended to be included within the scope of the following claims.

What is claimed is:

1. An optical head, comprising:

a splitter for splitting a light beam reflected from a surface of a recording medium into a first light beam and a second light beam, said splitter directing the first light beam to a focus error detection path and directing the second light beam to a tracking error detection path which is separate from the focus error detection path;

a photodetector including a first light receiving section for yielding a focus error signal and a second light receiving section for yielding a tracking error signal; and a transparent plate positioned in one of the focus error detection path and the tracking error detection path to produce a difference in focal point distance between the focus error detection path and the tracking error detection path so that a light spot from the second light beam produced on a light receiving surface of the second light receiving section is larger than a light spot which would be produced from the second light beam on a light receiving surface of the second light receiving section without said transparent plate, wherein said transparent plate has a light incident surface that receives a light beam and an output surface that outputs a light beam having a cross-section of the same shape as that received on the light incident surface.

2. The optical head according to claim 1, further comprising:

a cylindrical lens positioned in the tracking error detection path, and wherein the light receiving surface of the second light receiving section is divided by a division line into two light receiving elements, said cylindrical lens causing the spot on the light receiving surface to have a larger diameter in a direction perpendicular to the division line than in a direction parallel to the division line.

3. The optical head according to claim 1, further comprising:

a cylindrical lens positioned so that the first light beam and the second light beam pass therethrough, and wherein the light receiving surface of the second light receiving section is divided by a division line into two light receiving elements, the cylindrical lens causing the spot on the light receiving surface to have a larger diameter in a direction perpendicular to the division line than in a direction parallel to the division line.

4. The optical head according to claim 3, wherein the light receiving surface of the first light receiving section is divided by a division line into two light receiving elements, the division line being one of a substantially saw-tooth wave, a substantially triangular wave, and a substantially sinusoidal wave.

5. The optical head according to claim 1, wherein said transparent plate is positioned in the tracking error detection path.

6. The optical head according to claim 1, wherein said transparent plate is positioned in the focus error detection path.

7. The optical head according to claim 1, further comprising:

a light beam dividing element which branches the first light beam into a plurality of third light beams each having a substantially semi-circular cross section, the third light beams being converted incident to the first light receiving section, the light receiving section including a plurality of light receiving surfaces each of which is divided by a first division line into two light receiving elements, and wherein the light receiving surface of the second light receiving section is divided by a second division line into two light receiving areas, the second division line being substantially perpendicular to the first division line.

8. The optical head according to claim 7, further comprising a rotating member for variably rotating the light beam dividing element;

wherein the light beam dividing element is formed of a transparent material including two halves, a first half being a substantially flat plate and a second half being a diffraction grating or a wedge shaped plate.

9. The optical head according to claim 8, wherein said diffraction grating includes a plurality of grooves having a U-shaped cross section.

10. The optical head according to claim 8, wherein said diffraction grating includes a plurality of saw tooth elements.

11. The optical head of claim 1, wherein said photodetector houses said first and second light receiving sections in a single package.

12. A method of detecting tracking and focus errors for an optical head, comprising:

splitting a light beam reflected from a surface of a recording medium into a first light beam and a second light beam;

directing the first light beam along a focus error detection path;

directing the second light beam along a tracking error detection path which is separate from the focus error detection path;

generating a first light spot from the first light beam on a first light receiving section to yield a focus error signal;

generating a second light spot from the second light beam on a second light receiving section to yield a tracking error signal; and positioning a transparent plate in one of the focus error detection path and the tracking error detection path to produce a difference in the optical focal point distance of the tracking error detection path relative to the focus error detection path so that the second light spot generated on the second light receiving section is larger than a light spot that would be produced without the transparent plate, wherein the transparent plate has a light incident surface that receives a light beam and an output surface that outputs a light beam having a cross-section of the same shape as that received on the light incident surface.

13. The method of claim 12, further comprising:

creating a difference between a diameter of the second light beam along a first direction and a diameter along a second direction, perpendicular to the first direction.

14. The method of claim 12, further comprising:

splitting the first light beam into a plurality third light beams.

15. The method of claim 14, wherein said plurality of third light beams have a substantially semi-circular cross section.

* * * * *